US008592521B2

(12) United States Patent
Higuchi

(10) Patent No.: US 8,592,521 B2
(45) Date of Patent: Nov. 26, 2013

(54) METHOD FOR PREPARING A PRIMER COMPOSITION AND COATED PRODUCT

(75) Inventor: Koichi Higuchi, Annaka (JP)

(73) Assignees: Shin-Etsu Chemical Co., Ltd., Tokyo (JP); Kabushiki Kaisha Toyota Jidoshokki, Kariya-Shi (JP); Toyota Jidosha Kabushiki Kaisha, Toyota-Shi (JP)

( * ) Notice: Subject to any disclaimer, the term of this patent is extended or adjusted under 35 U.S.C. 154(b) by 839 days.

(21) Appl. No.: 12/554,305

(22) Filed: Sep. 4, 2009

(65) Prior Publication Data
US 2010/0062268 A1   Mar. 11, 2010

(30) Foreign Application Priority Data

Sep. 8, 2008 (JP) ................................. 2008-229986

(51) Int. Cl.
*C08K 5/54* (2006.01)
(52) U.S. Cl.
USPC ........... 524/858; 428/447; 524/492; 524/493; 524/495; 524/547; 524/315; 524/342
(58) Field of Classification Search
USPC .......... 428/447; 524/492, 493, 495, 547, 315, 524/342
See application file for complete search history.

(56) References Cited

U.S. PATENT DOCUMENTS

| 4,353,959 | A | 10/1982 | Olson et al. |
| 4,668,452 | A | 5/1987 | Watanabe et al. |
| 5,021,266 | A | 6/1991 | Yamaya et al. |
| 5,250,359 | A | 10/1993 | Funaki et al. |
| 5,498,666 | A * | 3/1996 | Nambu et al. ................. 525/100 |
| 6,620,509 | B1 | 9/2003 | Yamamoto et al. |
| 6,855,768 | B2 | 2/2005 | Matsumura et al. |
| 2006/0188664 | A1 * | 8/2006 | Ando et al. ..................... 428/1.1 |
| 2007/0219298 | A1 * | 9/2007 | Higuchi et al. ............... 524/106 |
| 2008/0096029 | A1 | 4/2008 | Higuchi et al. |

FOREIGN PATENT DOCUMENTS

| EP | 1408082 A2 | 4/2004 |
| EP | 1914259 A1 | 4/2008 |
| JP | 56-92059 A | 7/1981 |
| JP | 61-56187 B2 | 12/1986 |

(Continued)

OTHER PUBLICATIONS

Japanese Office Action dated Nov. 14, 2012, for Japanese Patent Application No. 2008-229986.

Primary Examiner — Ling Choi
Assistant Examiner — Darcy D Laclair Lynx
(74) Attorney, Agent, or Firm — Birch, Stewart, Kolasch & Birch, LLP

(57) ABSTRACT

A method for preparing a primer composition adapted to form a polysiloxane hard film on a cured primer layer of the composition comprising processes [1] or [2]: the process [1] comprising the steps of (I) preparing a primer precursor containing a vinyl polymer having a hydrolysable silyl group and an organic UV absorbing group bonded at side chains thereof and silica fine particles dispersed in an organic solvent; (II) adding water to the primer precursor obtained in (I) for hydrolysis; and (III) adding a dehydrating agent to the composition containing the hydrolyzate obtained in (II) to remove moisture from the composition; or the process [2] comprising (IV) hydrolyzing a vinyl polymer having a hydrolysable silyl group and an organic UV absorbing group bonded at side chains thereof by addition of water thereto; (V) adding silica fine particles dispersed in an organic solvent to the resulting hydrolyzate obtained in (IV); and (VI) adding a dehydrating agent to the composition obtained in (V) to remove moisture from the composition.

7 Claims, 3 Drawing Sheets

(56) References Cited

FOREIGN PATENT DOCUMENTS

| | | |
|---|---|---|
| JP | 1-149878 A | 6/1989 |
| JP | 8-151415 A | 6/1996 |
| JP | 3102696 B2 | 10/2000 |
| JP | 2001-47574 A | 2/2001 |
| JP | 2001-114841 A | 4/2001 |
| JP | 2001-214122 A | 8/2001 |
| JP | 2001-279176 A | 10/2001 |
| JP | 2004-1393 A | 1/2004 |
| JP | 2008-120986 A | 5/2008 |

* cited by examiner

METHOD FOR PREPARING A PRIMER COMPOSITION AND COATED PRODUCT

CROSS-REFERENCE TO RELATED APPLICATION

This non-provisional application claims priority under 35 U.S.C. §119(a) on Patent Application No. 2008-229986 filed in Japan on Sep. 8, 2008, the entire contents of which are hereby incorporated by reference.

TECHNICAL FIELD

This invention relates to a method for preparing a primer composition comprising a vinyl polymer having a hydrolysable silyl group and an organic UV absorbing group joined to side chains thereof, silica fine particles and an organic solvent, and also to a coated product comprising a substrate coated with, as a primer layer, a cured film of the above primer composition and a polysiloxane cured film further laminated on the surface of the primer layer.

BACKGROUND ART

Recently, transparent materials that are non-shattering properties or have a shattering resistance greater than glass have been widely employed in place of transparent sheet glass. For instance, since plastic substrates, particularly, carbonate resin substrates, are excellent in transparency, impact resistance, and heat resistance, they have now been used in various applications, in place of glass, including structural members such as windows of buildings and vehicles and instrument covers, and the like.

However, these materials are poorer in surface characteristics such as scratch resistance and weatherability than glass, so that there is a strong demand of improving the surface characteristics of polycarbonate resin moldings. In recent years, vehicle windows and sound-insulating walls for road have been required to withstand outdoor exposure over ten years or over.

For the improvement of weatherability of polycarbonate resin moldings, there have been proposed a method of laminating an acrylic resin film whose weatherability is excellent on the surface of a polycarbonate resin substrate and a method wherein a resin layer containing a UV absorber on the resin surface is provided by co-extrusion or the like.

Moreover, the methods of improving a scratch resistance of polycarbonate resin moldings have been proposed including a method wherein a thermosetting resin such as a polyorganosiloxane or melamine-based resin is coated thereon, and a method of coating a polyfunctional acrylic, photocurable resin.

On the other hand, the manufacture of transparent bodies having both good weatherability and scratch resistance has been known as described, for example, in JP-A 56-92059 and JP-A 1-149878 (referred to as Patent Documents 1 and 2, hereinafter), from which there is known a UV absorbing, transparent substrate wherein a protective film of a colloidal silica-containing polysiloxane coating composition is formed through a primer layer to which a large amount of a UV absorber is added.

However, the addition of a large amount of a UV absorber to the primer layer is disadvantageous in poor adhesion between the primer layer and the protective film formed from the colloidal silica-containing polysiloxane coating composition that is coated onto the upper surface of a substrate or the primer layer and also in the removal of the UV absorber from the composition during the thermal curing step, for example, by volatilization. In addition, where outdoor use is extended over a long term, the UV absorber is allowed to gradually bleed out thereby causing cracks, whitening or yellowing. Moreover, a problem is involved in that the UV absorber cannot be added in large amounts to the upper side protective film made of the colloidal silica-containing polysiloxane from the standpoint of the scratch resistance.

It is known, for example, in JP-A 8-151415 (Patent Document 3) that a protective film is formed on the surface of synthetic resins using, as coating ingredients, a benzotriazole-based UV absorbing vinyl monomer or benzophenone-based UV absorbing vinyl monomer and a vinyl monomer copolymerizable therewith. However, limitation is placed on the scratch resistance because of the protective film being made of the vinyl polymer.

Further, it is also known, for example, from JP-A 2001-114841, Japanese Patent No. 3102696 and JP-A 2001-214122 and JP-A 2001-47574 (Patent Documents 4 to 7) that there can be obtained multi-layered resin laminates, which are imparted with weatherability while keeping adhesion to a resin substrate, when using as a coating ingredient, a copolymer made up of a benzotriazole-based UV absorbing vinyl monomer or benzophenone-based UV absorbing vinyl monomer, an alkoxysilyl group-containing vinyl monomer, and a vinyl monomer copolymerizable therewith.

In these references, coated products imparted with a good scratch resistance and weatherability are obtained by providing these copolymer-containing coating compositions as a primer and forming a colloidal silica-containing polysiloxane resin film on the primer layer. Although these coated products are significantly improved in adhesion to the polysiloxane resin film and weatherability, crosslinking networking of the alkoxysilyl group in the primer layer is not allowed to proceed satisfactorily. Eventually, a non-cured residual alkoxysilyl group or hydroxysilyl group undergoes after crosslinkage with time, which is liable to cause a strain in the film, with the attendant disadvantage that defects such as of cracks and peeling off are apt to occur. Thus, long-term weatherability is still unsatisfactory. Additionally, when the film is exposed to an abrupt change in ambient temperature, especially, to a change at a relatively high temperature, the cracks ascribed to the above-mentioned after-crosslinkage is inconveniently liable to occur.

Further, in JP-A 2004-1393 (Patent Document 8), adhesion and anti-cracking properties are improved by specifying a difference in linear expansion coefficient between a substrate and a primer layer and also a difference in linear expansion coefficient between the primer layer and a polysiloxane cured layer. However, a UV absorber cannot be incorporated in the primer layer in large amounts and thus, long-term weatherability has been still unsatisfactory.

We have already proposed in JP-A 2008-120986 (Patent Document 9) a primer composition which includes a copolymer of a UV absorbing vinyl monomer, an alkoxysilyl group-containing vinyl monomer and a vinyl monomer copolymerizable with these monomers, and silica fine particles.

The film obtained by coating and curing the primer composition becomes low in linear expansion coefficient owing to the dense three-dimensional crosslinking network structure formed through the siloxane crosslinkage of the hydrolysable silyl group and/or the mutual crosslinkage of SiOH groups of the vinyl polymer and also through the siloxane crosslinkage between the hydrolysable silyl group and/or the SiOH of the vinyl polymer and the SiOH group on the silica fine particles and by the action of the low expansibility of the silica fine particles. As a result, the primer composition becomes smaller in the expansion and shrinkage ascribed to the temperature difference than existing primers. Accordingly, neither cracking nor peeling off develops in the polysiloxane cured resin coated on the primer film surface over a long time.

However, it has been found that when the primer composition is subjected to a long-term weatherability test, performance reproducibility for use as a primer lowers with respect to the cracking and peeling off although depending on the ambient temperature or humidity during the course of coating and curing. Thus, a further improvement should be needed.

SUMMARY OF THE INVENTION

It is accordingly an object of the invention to provide a method for preparing a primer composition which overcomes the drawbacks of cracking, peeling off and yellowing over a long time.

It is another object of the invention to provide a method for preparing a primer composition which is able to form a protective film whose weatherability is reproducibly excellent and is good at storage stability and which is very unlikely to be thickened or gelled over long-term storage or use. It is a further object of the invention to provide a coated product obtained by use of the primer composition.

In order to achieve the above objects, there is provided, according to the invention, a method for preparing a primer composition comprising a vinyl polymer (A) having a hydrolysable silyl group and an organic UV absorbing group bonded at side chains thereof, respectively, silica fine particles (B) dispersed in an organic solvent, and a dehydrating agent (C), the method comprising the following process [1] or [2], the process [1] comprising the steps of:

(I) preparing a primer precursor containing a vinyl polymer (A) having a hydrolysable silyl group and an organic UV absorbing group bonded at side chains, respectively, and silica fine particles (B) dispersed in an organic solvent;

(II) hydrolyzing the primer precursor obtained in (I) by addition of water thereto; and (III) adding a dehydrating agent (C) to the composition containing the resulting hydrolyzate obtained in (II) to remove moisture from the composition, or the process [2] comprising the steps of:

(IV) hydrolyzing a vinyl polymer (A) having a hydrolysable silyl group and organic UV absorbing group bonded at side chains thereof, respectively, by addition of water thereto;

(V) adding silica fine particles (B) dispersed in an organic solvent to the hydrolyzate obtained in (IV); and (VI) adding a dehydrating agent (C) to the composition obtained in (V) to remove moisture from the composition.

We have made extensive studies on primer compositions which are able to impart long-term weatherability to moldings of thermoplastic resins such as polycarbonate and which exhibit long-term storage stability and do not undergo thickening or gelation in long-term storage or use.

As a result, it has been found that the film, which is obtained by coating and curing either a primer composition obtained by adding for hydrolyzation water to a primer precursor which includes, as constituent ingredients, a vinyl polymer (A) having a hydrolysable silyl group and an organic UV absorbing group bonded at side chains thereof, respectively, and silica fine particles (B) dispersed in an organic solvent, or a primer composition obtained by hydrolyzing a vinyl polymer (A) having a hydrolysable silyl group and an organic UV absorbing group bonded at side chains thereof, respectively, by addition of water, followed by addition of silica fine particles (B) dispersed in an organic solvent, is advantageous for the following reason. More particularly, because the hydrolysable group of the vinyl polymer (A) has been preliminarily converted to the SiOH group, the mutual siloxane crosslinkage of the hydrolysable silyl groups and/or SiOH groups of the vinyl polymer (A) and the siloxane crosslinkage between the hydrolysable silyl groups and/or SiOH groups of the vinyl polymer (A) and the SiOH group on the surface of the silica fine particles (B) are promoted irrespective of the ambient temperature or humidity upon the coating and curing. The resulting dense three-dimensional crosslinking network structure and the low expansibility of the silica fine particles (B) bring about the lowering of the linear expansion coefficient. Thus, the expansion and shrinkage ascribed to the temperature difference become smaller than those of existing primers. Accordingly, a polysiloxane hard resin film covering the primer film on the surface thereof suffers no cracking or peeling off over a long time.

Moreover, since the vinyl polymer (A) has an organic UV absorbing group bonded at side chains thereof and is crosslinked within the film made of the primer composition, the UV absorbing group is fixed in the film. Eventually, it is very unlikely that the UV absorbing group migrates toward the film surface. In this sense, weatherability is remarkably improved with its function being held over a long time from the standpoints that no whitening phenomenon appears and adhesion does not lower, a reduced effect of lowering UV absorption with time without dissolving and flowing out to water, an organic solvent and the like, and no vaporization of the UV absorbing group from the film occurs when subjected to thermal curing treatment at high temperatures.

On the other hand, it has also been found that the hydrolysis of the vinyl polymer (A) brings about the conversion of the hydrolysable silyl group of the vinyl polymer (A) into the SiOH group, so that although crosslinkage is likely to proceed, the storage stability of the primer composition lowers considerably. To avoid this, the dehydrating agent (C) is added after the hydrolysis so as to remove residual moisture from the composition. This enables the primer composition to be prevented from thickening and gelling, ensuring long-term storage.

Further, where a polyorganosiloxane-based hard protective coating film is formed on the surface covered with the primer composition of the invention, reactivity with the organopolysiloxane protective coating film is imparted with the hydrolysable silyl group and/or SiOH group present in the vinyl polymer (A) and the SiOH group existing on the surface of the silica fine particles (B) and thus, adhesion is improved. Moreover, the crosslinkage of the hydrolysable silyl group and/or SiOH group contributes to improve a heat resistance along with excellent scratch resistance and weatherability.

In accordance with one aspect of the invention, there is provided a method for preparing a primer composition for forming a polysiloxane hard film, which method comprising the following steps (I) to (III):

(I) preparing a primer precursor containing a vinyl polymer (A) having a hydrolysable silyl group and an organic UV absorbing group bonded at side chains thereof and silica fine particles (B) dispersed in an organic solvent;

(II) adding water to the primer precursor obtained in (I) for hydrolysis; and (III) adding a dehydrating agent (C) to the composition containing the hydrolyzate obtained in (II).

According to another aspect of the invention, there is also provided a method for preparing a primer composition for forming a polysiloxane hard film, which method including the following steps (IV) to (VI):

(IV) hydrolyzing a vinyl polymer (A) having a hydrolysable silyl group and an organic UV absorbing group bonded at side chains thereof by addition of water thereto;

(V) adding silica fine particles (B) dispersed in an organic solvent to the resulting hydrolyzate obtained in (IV); and (VI) adding a dehydrating agent (C) to the composition obtained in (V) to remove moisture from the composition.

In the above embodiments, it is preferred that the dehydrating agent (C) is at least one member selected from an orthocarboxylic ester, a dialkylcarbodiimide and a solid adsorbent.

More preferably, the dehydrating agent (C) is at least one member selected from a methyl orthoformate, an ethyl orthoformate, a methyl orthoacetate and an ethyl orthoacetate.

The amount of water used for the hydrolysis is preferably in the range of less than 5 moles per mole of the hydrolysable silyl group in the vinyl polymer (A).

Preferably, the vinyl polymer (A) is further formulated with at least one member selected from a hydrolysable silicon compound and a partially or fully hydrolysed condensate (D) thereof to co-hydrolyze.

The member (D) is preferably a compound containing a nitrogen atom and an alkoxysilyl group in the molecule.

Further, it is preferred that the vinyl polymer (A) is one that is obtained by copolymerizing monomer ingredients comprising a vinyl monomer (a-1) having a hydrolysable silyl group bonded thereto through a C—Si bond, a vinyl monomer (a-2) having an organic UV absorbing group, and other copolymerizable monomer (a-3).

The silica fine particles (B) dispersed in an organic medium or solvent preferably have a primary particle size within a range of 0.5 to 100 nm.

According to a further aspect of the invention, there is provided a coated product obtained by coating and curing the primer composition obtained above to provide a cured film, and further applying a polysiloxane hard film onto the surface of the cured film.

In the coated product, the polysiloxane hard film is formed of a hard coating composition including a hydrolyzate or co-hydrolyzate of at least one of organooxysilanes represented by the formula

$(R^7)_m Si(OR^8)_{4-m}$ (1)

wherein $R^7$ represents an organic group having 1 to 10 carbon atoms, $R^8$ represents a hydrogen atom or a monovalent organic group, and m is 0, 1 or 2.

Effect of the Invention

The primer composition of the invention holds the organic UV absorbing group in large quantities thereby improving lightfastness remarkably. Moreover, the organic UV absorbing group is fixed within the film because of the siloxane crosslinkage thereof so that the UV absorbing group is prevented from being lost with time. The hydrolysable silyl group-bearing vinyl polymer is hydrolyzed beforehand, so that the siloxane crosslinkage between the vinyl polymer and the silica fine particles proceeds satisfactorily. Thus, the resulting primer film lowers in linear expansion coefficient and serves as a binder with good weatherability, thereby providing a UV absorbing, protective film that is excellent in waterproofing, solvent resistance and lightfastness. If the primer composition is applied onto articles whose weatherability is poor and cured, the coloration and degradation of the products can be suppressed and thus, the products can be imparted with good weatherability. If the hydrolysable silyl group-bearing vinyl polymer is hydrolyzed beforehand, the primer composition is thickened and gelled remarkably with time. Nevertheless, addition of a dehydrating agent ensures long-term storage stability of the composition without thickening and gelation.

The plastic products coated with the film made of the primer composition of the invention, especially, polycarbonate products, are imparted with excellent transparency and weatherability. If a polysiloxane hard film is further laminated over the primer film, scratch and chemical resistances can also be imparted. The laminate is suited as windows of transporters such as vehicles, airplanes and the like, windshields, windows of buildings, and for outdoor applications employed as sound-insulating walls of roads.

DETAILED DESCRIPTION OF THE PREFERRED EMBODIMENTS

Figure 1:
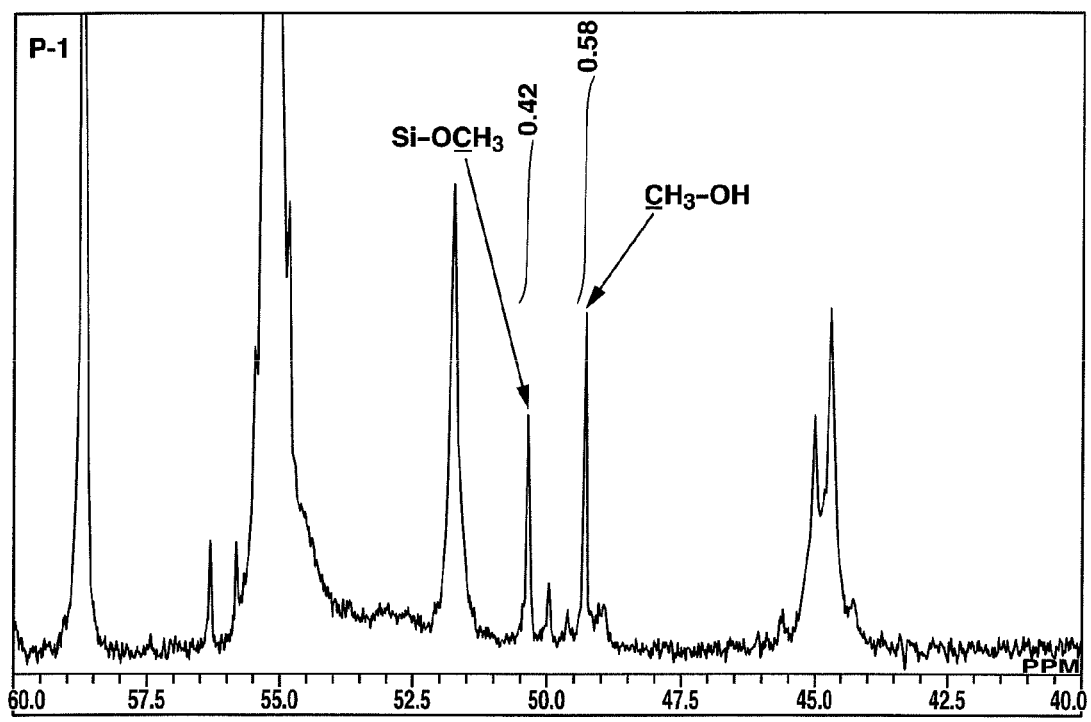
FIG. 1 is a $^{13}$C-NMR spectral chart of primer composition P-1 in Example 1.

The method for preparing a primer composition includes the following process [1] or [2],
the process [1] comprising the steps of:
(I) preparing a primer precursor containing a vinyl polymer (A) having a hydrolysable silyl group and an organic UV absorbing group bonded at side chains thereof and silica fine particles (B) dispersed in an organic solvent;
(II) adding water to the primer precursor obtained in (I) for hydrolysis; and
(III) adding a dehydrating agent (C) to the composition containing the hydrolyzate obtained in (II) to remove moisture from the composition, or
the process [2] comprising the steps (IV) to (VI):
(IV) hydrolyzing a vinyl polymer (A) having a hydrolysable silyl group and an organic UV absorbing group bonded at side chains thereof by addition of water thereto;
(V) adding silica fine particles (B) dispersed in an organic solvent to the resulting hydrolyzate obtained in (IV); and
(VI) adding a dehydrating agent (C) to the composition obtained in (V) to remove moisture from the composition.

The essential ingredients used to prepare the primer composition of the invention include the vinyl polymer (A) having a hydrolysable silyl group and an organic UV absorbing group boded at side chains thereof, the silica fine particles (B) dispersed in an organic solvent, and the dehydrating agent (C).

Preferably, the vinyl polymer (A) is one wherein the hydrolysable silyl group is bonded to the main chain of the vinyl polymer through a Si—C bond and it is also preferred that the organic UV absorbing group is bonded to the main chain of the vinyl polymer as well. Such a polymer can be obtained by copolymerizing a vinyl monomer (a-1) to which the hydrolysable silyl group is bonded through a C—Si bond, a vinyl monomer (a-2) having the organic UV absorbing group, and other copolymerizable monomer (a-3).

The vinyl monomer (a-1) wherein the hydrolysable silyl group is bonded via the Si—C bond may be any one so far as it contains one vinyl polymerizable functional group and at least one hydrolysable silyl group in the molecule.

The vinyl polymerizable functional group includes an organic group having 2 to 12 carbon atoms and containing a vinyl group, a vinyloxy group, a (meth)acryloxy group or an (α-methyl)styryl group. Specific examples include vinyl group, 5-hexenyl group, 9-decenyl group, vinyloxymethyl group, 3-vinyloxypropyl group, (meth)acryloxymethyl group, 3-(meth)acryloxypropyl group, 11-(meth)acryloxyundecyl group, vinylphenyl group (styryl group), isopropenylphenyl group (α-methylstyryl group), and vinylphenylmethyl group (vinylbenzyl group). In view of the reactivity and ease in availability, the use of the (meth)acryloxypropyl group is preferred.

Specific examples of the hydrolysable group include alkoxy groups such as methoxy group, ethoxy group, propoxy group, isopropoxy group, butoxy group, isobutoxy group, sec-butoxy group, tert-butoxy group and the like, acyloxy groups such as phenoxy group, acetyloxy group and the like, oxime groups such as butanoxime group, amino groups such as amino group, methylamino group and the like, and a halogen group such as chloro group. In view of the ease in controlling hydrolyzability and ease in availability, alkoxy groups such as methoxy group and ethoxy group are conveniently used.

The substituent groups other than the above substituent groups include an alkyl group such as methyl group, ethyl group, propyl group, hexyl group, decyl group and the like, and phenyl group. In view of the ease in availability, the use of methyl group is preferred.

Examples of the vinyl monomer (a-1) to which the hydrolyzable silyl group is bonded through the C—Si bond include methacryloxymethyltrimethoxysilane, methacryloxypropyltrimethoxysilane, methacryloxyundecyltrimethoxysilane, methacryloxypropylmethyldimethoxysilane, methacryloxypropyldimethylmethoxysilane, methacryloxypropyltriethoxysilane, acryloxypropyltrimethoxysilane, acryloxypropylmethyldimethoxysilane, acryloxypropyldimethylmethoxysilane, acryloxypropyltriethoxysilane, acryloxymethyltrimethoxysilane, acryloxyundecyltrimethoxysilane, vinyltrimethoxysilane, vinyltriethoxysilane, vinylmethyldimethoxysilane, allyltrimethoxysilane, styryltrimethoxysilane, styrylmethyldimethoxysilane, styryltriethoxysilane, and the like. Of these, methacryloxypropyltrimethoxysilane, methacryloxypropylmethyldimethoxysilane, methacryloxypropyldimethylmethoxysilane, acryloxypropyltrimethoxysilane, and acryloxypropylmethyldimethoxysilane are preferred because of the ease in availability, handling properties, crosslinking density and reactivity.

The amount of vinyl monomer (a-1) to which the hydrolyzable silyl group is bonded through the C—Si bond ranges from 1 to 50% by weight, preferably 3 to 40% by weight, based of the copolymerizable composition. If the amount is less than 1% by weight, the formation of the siloxane network structure ascribed to the crosslinkage with silica fine particles and also the mutual crosslinkage of the vinyl copolymer becomes unsatisfactory, so that the linear expansion coefficient of the resulting film does not become significantly low, with the possibility that the heat resistance and durability may not be improved. On the contrary, when the amount exceeds 50% by weight, the crosslinking density is too high. As a result, the vinyl monomer (a-1) becomes hard, thereby lowering adhesion. Also, non-reactive hydrolyzable groups or the SiOH group is liable to remain, with some case where after-crosslinkage may occur with time and cracks are apt to develop.

Next, the vinyl monomer (a-2) having an organic UV absorbing group is described. For this, there may be used any vinyl monomers so far as they have a UV absorbing group and a vinyl polymerizable group in the molecule.

Specific examples of the vinyl monomer (a-2) include (math)acrylic monomers having an organic UV absorbing group in the molecule and include benzotriazole compounds represented by the following general formula (2) and benzophenone compounds represented by the following general formula (3),

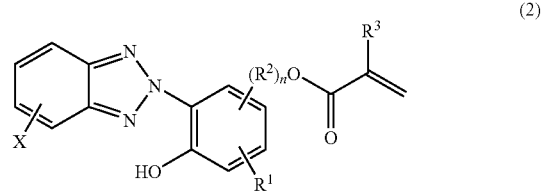

(2)

wherein X represents a hydrogen atom or a chlorine atom, $R^1$ represents a hydrogen atom, a methyl group, or a tertiary alkyl group having 4 to 8 carbon atoms, $R^2$ represents an linear or branched alkylene group having 2 to 10 carbon atoms, $R^3$ represents a hydrogen atom or a methyl group, and n is 0 or 1,

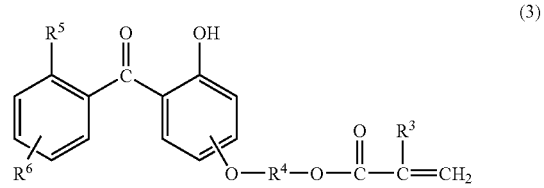

(3)

wherein $R^3$ has the same meaning as defined above, $R^4$ represents a substituted or unsubstituted, linear or branched alkylene group having 2 to 10 carbon atoms, $R^5$ represents a hydrogen atom or a hydroxyl group, and $R^6$ represents a hydrogen atom, a hydroxyl group or an alkoxy group having 1 to 6 carbon atoms.

In the above general formula (2), the tertiary alkyl group represented by $R^1$ and having 4 to 8 carbon atoms include, tert-butyl group, tert-pentyl group, tert-hexyl group, tert-heptyl group, tert-octyl group, di-tert-octyl group and the like.

The linear or branched alkylene group represented by $R^2$ and having 2 to 10 carbon atoms include ethylene group, trimethylene group, propylene group, tetramethylene group, 1,1-dimethyltetramethylene group, butylene group, octylene group, decylene group or the like.

In the above general formula (3), the linear or branched alkylene group represented by $R^4$ and having 2 to 10 carbon atoms is similar to that exemplified with respect to $R^2$ above, or such an exemplified group wherein part of the hydrogen atoms thereof is replaced by a halogen atom. The alkoxy group represented by $R^6$ includes methoxy group, ethoxy group, propoxy group, butoxy group or the like.

Specific examples of the benzotriazole compound represented by the general formula (2) include 2-(2'-hydroxy-5'-(meth)acryloxyphenyl)-2H-benzotriazole, 2-(2'-hydroxy-3'-tert-butyl-5'-(meth)acryloxymethylphenyl)-2H-benzotriazole, 2-[2'-hydroxy-5'-(2-(meth)acryloxyethyl)phenyl]-2H-benzotriazole,
2-[2'-hydroxy-3'-tert-butyl-5'-(2-(meth)acryloxymethyl)-phenyl]-5-chloro-2H-benzotriazole,
2-[2'-hydroxy-3'-methyl-5'-(8-(meth)acryloxyoctyl)phenyl]-2H-benzotriazole, and the like.

Specific examples of the benzophenone compounds represented by the general formula (3) include
2-hydroxy-4-(2-(meth)acryloxyethoxy)benzophenone,
2-hydroxy-4-(4-(meth)acryloxybutoxy)benzophenone,
2,2'-dihydroxy-4-(2-(meth)acryloxyethoxy)benzophenone,
2,4-dihydroxy-4'-(2-(meth)acryloxyethoxy)benzophenone,
2,2',4-trihydroxy-4'-(2-(meth)acryloxyethoxy)benzophenone,
2-hydroxy-4-(3-(meth)acryloxy-2-hydroxypropoxy)benzophenone,
2-hydroxy-4-(3-(meth)acryloxy-1-hydroxypropoxy)benzophenone and the like.

Of these UV absorbing vinyl monomers, the benzotriazole compounds represented by the formula (2) are preferred, among which 2-[2'-hydroxy-5'-(2-(meth)acryloxy-ethyl)phenyl]-2H-benzotriazole is more preferred.

Further, the UV absorbing vinyl monomers may be used singly or in combination of two or more.

The amount of the vinyl monomer (a-2) having an organic UV absorbing group ranges from 1 to 30% by weight, preferably from 3 to 25% by weight, based on the copolymerizable composition. If the amount is less than 1% by weight, good weatherability is not obtained. Over 30% by weight, there is some case where film adhesion may lower or a film appearance failure such as whitening may be caused.

Next, other type of monomer (a-3) copolymerizable with the monomers (a-1) and (a-2) are not critical so far as copolymerizable monomers are used. Examples include (meth)acrylic monomers having a cyclic hindered amine structure, (meth)acrylic esters, (meth)acrylonitriles, (meth)acrylamides, alkyl vinyl ethers, alkyl vinyl esters, styrene and derivatives thereof.

Specific examples of the (meth)acrylic monomer having a cyclic hindered amine structure include 2,2,6,6-tetramethyl-4-piperidinyl methacrylate, 1,2,2,6,6-pentamethyl-4-piperidinyl methacrylate and the like. These photostabilizers may be used singly or in combination of two or more.

Specific examples of the (meth)acrylic esters and derivatives thereof include: (meth)acrylic esters of monohydric alcohols such as methyl (meth)acrylate, ethyl (meth)acrylate, n-propyl (meth)acrylate, isopropyl (meth)acrylate, n-butyl (meth)acrylate, isobutyl (meth)acrylate, sec-butyl (meth)acrylate, t-butyl (meth)acrylate, n-pentyl (meth)acrylate, isopentyl (meth)acrylate, n-hexyl (meth)acrylate, isohexyl (meth)acrylate, n-heptyl (meth)acrylate, isoheptyl (meth)acrylate, 2-ethylhexyl (meth)acrylate, n-octyl (meth)acrylate, isooctyl (meth)acrylate, n-nonyl (meth)acrylate, isononyl (meth)acrylate, n-decyl (meth)acrylate, isodecyl (meth)acrylate, n-undecyl (meth)acrylate, n-dodecyl (meth)acrylate, lauryl (meth)acrylate, palmityl (meth)acrylate, stearyl (meth)acrylate, cyclohexyl (meth)acrylate, 4-methylcyclohexyl (meth)acrylate, 4-t-butylcyclohexyl (meth)acrylate, isobonyl (meth)acrylate, dicyclopentanyl (meth)acrylate, dicyclopentenyloxyethyl (meth)acrylate, benzyl (meth)acrylate, and the like; (meth)acrylic esters of alkoxy(poly)alkylene glycols such as 2-methoxyethyl (meth)acrylate, 2-methoxypropyl (meth)acrylate, 3-methoxypropyl (meth)acrylate, 2-methoybutyl (meth)acrylate, 3-methoxybutyl (meth)acrylate, 4-methoxybutyl (meth)acrylate, methoxy-polyethylene glycol (meth)acrylate (wherein ethylene glycol units are, for example, at 2 to 20), methoxypolypropylen glycol (meth)acrylate (wherein propylen glycol glycol units are, for example, at 2 to 20), and the like; mono(meth)acrylic esters of polyhydric alcohols such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate, glycerine mono(meth)acrylate, pentaerythritol mono(meth)acrylate, polyethylene glycol mono(meth)acrylate (wherein ethylene glycol units are, for example, at 2 to 20), poly propylene glycol mono(meth)acrylate (wherein propylene glycol units are, for example, at 2 to 20), and the like; poly(meth)acrylic esters of polyhydric alcohols such as ethylene glycol di(meth)acrylate, propylene glycol di(meth)acrylate, butylene glycol di(meth)acrylate, glycerine di(meth)acrylate, glycerine tri(meth)acrylate, pentaerythritol di(meth)acrylate, pentaerythritol tetra(meth)acrylate, 1,4-cyclohexane diol di(meth)acrylate, polyethylene glycol di(meth)acrylate (wherein the ethylene glycol units are, for example, at 2 to 20), polypropylene glycol di(meth)acrylate (wherein the propylene glycol units are, for example, at 2 to 20), and the like; (poly)esters of non-polymerizable polybasic acids and hydroxyalkyl (meth)acrylates such as mono[2-(meth)acryloyloxyethyl]succinate, di[2-(meth)acryloyloxyethyl]succinate, mono[2-(meth)acryloyloxyethyl]adipate, di[2-(meth)acryloyloxyethyl]adipate, mono[2-(meth)acryloyloxyethyl]phthlate, di[2-(meth)acryloyloxyethyl]phthalate and the like; amino group-containing (meth)acrylic esters such as 2-aminoethyl (meth)acrylate, 2-(N-methylamino)ethyl (meth)acrylate, 2-(N,N-dimethylamino)ethyl (meth)acrylate, 2-(N-ethylamino)ethyl (meth)acrylate, 2-(N,N-diethylamino)ethyl (meth)acrylate, 3-(N,N-dimethylamino)propyl (meth)acrylate, 4-(N,N-dimethylamino)butyl (meth)acrylate, and the like; and epoxy group-containing acrylic esters such as glycidyl (meth)acrylate and the like.

Specific examples of the (meth)acrylonitriles include α-chloroacrylonitrile, α-chloromethylacrylonitrile, α-trifluoromethylacrylonitrile, α-methoxyacrylonitrile, α-ethoxyacrylonitrile, vinylidene cyanide and the like.

Specific examples of the (meth)acrylamide derivative include N-methyl (meth)acrylamide, N,N-dimethyl (meth)acrylamide, N-ethyl (meth)acrylamide, N-diethyl (meth)acrylamide, N-methoxy (meth)acrylamide, N,N-dimethoxy (meth)acrylamide, N-ethoxy (meth)acrylamide, N,N-diethoxy (meth)acrylamide, diacetone (meth)acrylamide, N-methylol (meth)acrylamide, N-(2-hydroyethyl) (meth)acrylamide, N,N-dimethylaminomethyl (meth)acrylamide, N-(2-dimethylamino)ethyl (meth)acrylamide, N,N'-methylene bis(meth)acrylamide, N,N'-ethylene bis(meth)acrylamide and the like.

Specific examples of the alkyl vinyl ether include methyl vinyl ether, ethyl vinyl ether, butyl vinyl ether, hexyl vinyl ether and the like.

Specific examples of the alkyl vinyl ester include vinyl formate, vinyl acetate, vinyl acrylate, vinyl butyrate, vinyl caproate, vinyl stearate and the like.

Specific examples of styrene and derivatives thereof include styrene, α-methylstyrene, vinyltoluene and the like.

Of these monomers, (meth)acrylic esters are preferred and specific preferred examples include methyl (meth)acrylate, ethyl (meth)acrylate, isopropyl (meth)acrylate, n-butyl (meth)acrylate, isobutyl (meth)acrylate, n-hexyl (meth)acrylate, 2-ethylhexyl (meth)acrylate, isononyl (meth)acrylate, lauryl (meth)acrylate, cyclohexyl (meth)acrylate, 4-methylcycohexyl (meth)acrylate, 4-t-butylcyclohexyl (meth)acrylate, isobornyl (meth)acrylate, dicyclopentanyl (meth)acrylate, dicyclopentenyloxyethyl (meth)acrylate, and the like.

Other copolymerizable monomers (a-3) mentioned above may be used singly or in combination of two or more.

The amount of such other copolymerizable monomer (a-3) ranges from 20 to 98% by weight, preferably from 35 to 94% by weight, based on the copolymerization composition. Too large an amount of the monomer (a-3) leads to unsatisfactory degrees of mutual crosslinkage of the resulting vinyl copolymer and crosslinkage with the silica fine particles. Eventually, there is concern that because the linear expansion coefficient of the resulting film does not become low, the heat resistance and durability may not be improved, and good weatherability may not be obtained. A smaller range of amount may cause a film appearance failure such as of whitening because the crosslinking density becomes too high, thereby lowering adhesion.

For the preparation of the vinyl copolymer (A), the copolymerization reaction of the vinyl monomer (a-1) to which the hydrolyzable silyl group is bonded through the C—Si bond, the vinyl monomer (a-2) having an organic UV absorbing group and other copolymerizable monomer (a-3) can be carried out according to known processes. For example, a radical polymerization initiator selected from peroxides such as dicumyl peroxide, benzoyl peroxide and the like and azo compounds such as azobisisobutyronitrile and the like is added to a mixture of these monomers, followed by reaction under heating conditions of 50 to 150° C., preferably 70 to 120° C. for 1 to 10 hours, preferably 3 to 8 hours, thereby readily obtaining the vinyl copolymer (A). In this connection, the reaction may be carried out in an organic solvent. Examples of the organic solvent include, for example, diacetone alcohol, propylene glycol monomethyl ether; ethylene glycol monomethyl ether, propylene glycol monoethyl ether, ethylene glycol monoethyl ether, isobutyl alcohol, isopropyl alcohol, n-butyl alcohol, n-propyl alcohol, acetone, methyl ethyl ketone, methyl isobutyl ketone, acetylacetone, ethyl acetate, butyl acetate, xylene, toluene and the like.

It will be noted that a weight average molecular weight of the vinyl polymer based on gel permeation chromatography (GPC) based on polystyrene standard preferably ranges from 1,000 to 300,000, more preferably from 5,000 to 250,000. If the molecular weight is too great, difficulties may be involved in its preparation and handling. On the contrary, too small an amount may, in some case, cause an appearance failure such as whitening of the resulting film and may not ensure satisfactory adhesion, durability and weatherability.

The silica fine particles (B) dispersed in organic solvents, which are one of the essential ingredients used in the primer composition of the invention, are now described.

No limitation is placed on the silica fine particles (B) so far as the particles are dispersed in an organic solvent. Since the silica fine particles (B) have an SiOH group on the particle surfaces, they allow siloxane crosslinkage with the hydrolyzable silyl group of the vinyl polymer (A) and/or the SiOH group formed by hydrolysis of the hydrolyzable silyl group, thereby forming an organic-inorganic composite material resulting from the siloxane crosslinkage between the hydrolyzable silyl group and/or the SiOH group of the vinyl polymer (A) and the SiOH group on the surface of the silica fine particles (B). As a consequence, the linear expansion coefficient lowers.

The organic solvents used for dispersing the silica fine particles (B) include methanol, ethanol, isopropanol, n-butanol, ethylene glycol, ethyl cellosolve, butyl cellosolve, propylene glycol monomethyl ether, propylene glycol monomethyl ether acetate, dimethylformamide, dimethylacetamide, methyl ethyl ketone, methyl isobutyl ketone, and a mixture of xylene and n-butanol. Of these, when taking the solubility of the vinyl polymer (A) into account, there are preferably used ethylene glycol, ethyl cellosolve, butyl cellosolve, propylene glycol monomethyl ether, propylene glycol monomethyl ether acetate, methyl ethyl ketone, methyl isobutyl ketone and the like.

From the standpoint of dispersability in and transparency of the primer cured film, the silica fine particles (B) should preferably have a primary particle size of 0.5 to 100 nm. More preferably, the primary size ranges from 2 to 50 nm. Over 100 nm, the dispersion stability of the silica fine particles (B) in the composition may lower and the transparency of the resulting cured film may lower.

The silica fine particles (B) dispersed in such an organic solvent is preferably colloidal silica dispersed in an organic solvent, which is called organosilica sol. Specific examples include silica sol dispersed in ethylene glycol, silica sol in ethylene glycol mono-n-propyl ether, silica sol in ethyl cellosolve, silica sol in butyl cellosolve, silica sol in propylene glycol monomethyl ether, silica sol in propylene glycol monomethyl ether acetate, silica sol in methyl ethyl ketone, and silica sol in methyl isobutyl ketone.

The silica fine particles (B) dispersed in such organic solvents as mentioned above or sols may be used singly or in combination.

It will be noted that commercial products are in fact used as the colloidal silica dispersed in organic solvents. For instance, such commercial products include, aside from PMA-ST, MEK-ST and MIBK-ST (all, made by Nissan Chemical Industries, Ltd.) used in Examples 1 to 4 appearing hereinafter, IPA-ST-L, IPA-ST-MS, EG-ST-ZL, DMAC-ST-ZL and XBA-ST (all, made by Nissan Chemical Industries, Ltd.), and OSCAL 1132, 1332, 1532, 1722 and ELCOM ST-1003SIV (all, made by JGC Catalysts and Chemicals Ltd.).

The amount of the silica fine particles (B) dispersed in an organic solvent is preferably such that the solid content of the silica fine particles (B) ranges preferably from 0.1 to 100 parts by weight, more preferably from 1 to 50 parts by weight, per 100 parts by weight of the resin content of the vinyl polymer (A). If the silica fine particles (B) are added in amounts exceeding 100 parts by weight, the crosslinking density in the coating layer of the primer composition of the invention becomes too high, so that there is concern that the resulting film becomes so high in hardness that a failure in adhesion to a substrate or a polysiloxane film laminated on the coating layer surface occurs and thickening and gelation are apt to take place. If the content is less than 0.1 part by weight, the crosslinking density of the resulting film does not become appropriately low and thus, expected adhesion and crack resistance may not be obtained in some case.

In the practice of the invention, the vinyl polymer (A) having such hydrolyzable silyl group and organic UV absorbing group boned to side chains, respectively, is singly hydrolyzed to convert the hydrolyzable silyl group into an SiOH group. Alternatively, the vinyl polymer (A) and the silica fine particles (B) dispersed in an organic solvent may be mixed to provide a primer precursor and hydrolyzed to convert the hydrolyzable silyl group in the primer precursor into an SiOH group. In doing so, when the primer composition of the invention is cured, crosslinkage is likely to proceed, thereby lowering the linear expansion coefficient of the primer layer to a greater extent.

The primer composition of the invention should preferably contain the organic-inorganic composite material obtained by reaction between the vinyl polymer (A) and the silica fine particles (B) dispersed in an organic solvent. As stated above, when these are hydrolyzed beforehand so that the hydrolyzable silyl group of the vinyl polymer (A) is converted into the SiOH group, the organic-inorganic composite material is likely to be formed.

The hydrolysis of the vinyl polymer (A) is carried out by use of water. Water is not critical in nature and is preferably acidic or neutral. Materials used to render water acidic are preferably ones that are not left in a primer film after formation of the film. If such a material is left in the primer film, intended adhesion and crack resistance may not be obtained in some case. More preferably, organic acids are used and specific examples include organic carboxylic acids such as formic acid, acetic acid, propionic acid, oxalic acid and the like. Of these, when volatility is taken into account in order to permit an acid not to be left in the film, formic acid and acetic acid are preferred.

The amount of water is not critical so far as miscibility with the primer precursor or the vinyl polymer (A) is ensured to provide a uniform mixture. More particularly, the amount of water ranges less than 5 moles, more preferably from 0.1 to less than 5 moles and most preferably from 0.3 to 3 moles, per mole of the hydrolyzable silyl group in the vinyl polymer (A). If the amount is too high, storage stability may lower, with some case where the composition is thickened or gelled during storage or in use.

The hydrolysis may be effected by a known technique and is preferably carried out under conditions of 0 to 120° C. and 0.5 to 24 hours, more preferably 20 to 80° C. and 1 to 10 hours.

The rate of hydrolysis is preferably from 3 to 100%, more preferably from 5 to 95%.

This rate can be determined, for example, by subjecting a sample to $^{13}$C-NMR analysis and calculating the rate according to the following equation by use of integral values of a peak derived from the methoxysilyl group observed at 50.0 to 50.5 ppm and a peak derived from methanol formed by the hydrolysis and observed at 49.0 to 49.5 ppm.

Rate of hydrolysis(%)=[integral value of methanol-derived peak/(integral value of methanol-derived peak+integral value of methoxysilyl group-derived peak)]×100

This rate can be determined in a similar way if the hydrolyzable group is not the methoxy group.

It will be noted that the hydrolysis may be carried after the primer precursor containing the vinyl polymer (A) and the silica fine particles (B) dispersed in an organic solvent has been obtained. Alternatively the vinyl polymer (A) may be hydrolyzed singly. With the single hydrolysis, the silica fine particles (B) dispersed in an organic solvent is added to the resulting hydrolyzate.

The dehydrating agent (C) serving as a further essential ingredient used in the primer composition of the invention is now described. When the vinyl polymer (A) having the hydrolyzable silyl group is hydrolyzed, the primer composition becomes more thickened and gelled with time. Accordingly, addition of a dehydrating agent ensures long-term storage stability without thickening and gelling. The dehydrating agent is not critical in type so far as it is able to remove residual moisture from the hydrolyzed primer composition, and is selected, for example, from orthocarboxylic esters, dialkylcarbodiimides and solid adsorbents. Preferably examples include organic dehydrating agents such as methyl orthoformate, ethyl orthoformate, methyl orthoacetate, ethyl orthoacetate, dicyclohexylcarbodiimide and the like, and inorganic solid adsorbents such as aluminosilicates, silica, alumina and the like. Where the inorganic solid adsorbent is used as a dehydrating agent, it is necessary to remove the solid adsorbent by filtration. When taking it into consideration that the dehydrating agent is not left in the film of the primer composition, there are preferably used methyl orthoformate, ethyl orthoformate, methyl orthoacetate and ethyl orthoacetate.

Such inorganic solid adsorbents as mentioned above are commercially available. For example, commercially available products include Molecular Sieve 3A, 4A (made by Wako Pure Chemical Industries, Ltd.).

The dehydrating agent (C) is added to the hydrolyzate. In the connection, the dehydrating agent (C) may be added to a reaction mixture after hydrolysis. The amount of the dehydrating agent (C) may be one that is effective for removing moisture left in the primer composition. Preferably, the dehydrating agent is used in the range of 1 to 20 moles, more preferably from 2 to 10 moles, per mole of water. When the dehydrating agent (C) is added in amounts exceeding 20 moles per mole of water, appearance abnormality is apt to develop when the primer composition is formed as a film. If the amount is less than 1 mole, residual moisture in the primer composition cannot be adequately dehydrated, with the concern that the composition becomes thickened and gelled with time and intended storage stability cannot be obtained.

Next, the primer composition of the invention further includes, aside from the essential ingredients set out above, (D) a hydrolyzable silicon compound and/or a (partial) hydrolysis condensate thereof. The hydrolyzable silicon compound is preferably an organosilicon compound containing a nitrogen atom and an alkoxysilyl group in the molecule.

The organosilicon compound having a nitrogen atom and an alkoxysilyl group in the molecule and used as the ingredient (D) is particularly described. The formulation of the organosilicon compound is advantageous in imparting good waterproofing adhesion to the layer of the resulting primer composition. Moreover, because of the crosslinkage with the hydrolyzable silyl group and/or SiOH group of the vinyl polymer (A) wherein such a hydrolyzable silyl group and organic UV absorbing group are bonded to side chains thereof, respectively, the primer film becomes densed. Additionally, such crosslinking reactions are promoted by the action of the nitrogen atom in the organosilicon compound and thus, the amount of the residual alkoxysilyl group in the film can be reduced, thereby suppressing cracks from developing in after-crosslinkage with a lapse of time. Besides, other types of additives such as, for example, a UV absorbent and a photostabilizer that is added as required, can be efficiently fixed in the primer composition film.

The organosilicon compounds having a nitrogen atom and an alkoxysilyl group in the molecule are preferably those compounds having one or more nitrogen atoms and one or more alkoxysilyl groups in the molecule and are more preferably ones having one or more nitrogen atoms and two or more alkoxysilyl groups in the molecule. Such compounds include amino group-containing alkoxysilanes, amino group-containing di(alkoxysilanes), amide group-containing alkoxysilanes, products obtained by amidizing reaction products of amino group-containing alkoxysilanes, epoxy group-containing alkoxysilanes and silylizing agents, reaction products of amino group-containing alkoxysilanes and dicarboxylic anhydrides, reaction products of amino group-containing alkoxysilanes and (poly)(meth)acrylic compounds, reaction products of amino group-containing alkoxysilanes and (meth)acryl group-containing alkoxysilanes, reaction products of polyamine compounds and (meth)acryl group-containing alkoxysilanes, amidized products of reaction products of amino group-containing alkoxysilanes and polyisocyanate compounds, (poly)silane compounds containing an isocyanurate ring and the like. More preferably, there are used amidized ones of reaction products of amino group-containing alkoxysilanes, epoxy group-containing alkoxysilanes and silylizing agents, and reaction products of amino group-containing alkoxysilanes and dicarboxylic anhydrides.

Specific examples of the amino group-containing alkoxysilanes include 3-aminopropyltrimethoxysilane, 3-aminopropyltriethoxysilane, 3-aminopropylmethyldimethoxysilane, 3-aminopropylmethyldiethoxysilane, N-(2-aminoethyl)-3-aminopropyltrimethoxysilane, N-(2-aminoethyl)-3-aminopropyltriethoxysilane, N-(2-aminoethyl)-3-aminopropylmethyldimethoxysilane, N-(2-aminoethyl)-3-aminopropylmethyldiethoxysilane, 3-(trimethoxysilylpropyl)aminopropyltrimethoxysilane, 3-(triethoxysilylpropyl)aminopropyltriethoxysilane, 2-(trimethoxysilylpropyl)aminoethyl-3-aminopropyltrimethoxy-silane, 2-(triethoxysilylpropyl)aminoethyl-3-aminopropyltriethoxy-silane, N-phenyl-3-aminopropyltrimethoxysilane, N-vinylbenzyl-3-aminopropyltriethoxysilane and hydrochlorides thereof.

Examples of the amino group-containing di(alkoxysilanes) include bis(trimethoxysilylpropyl)amine and the like.

Examples of the amide group-containing alkoxysilane include ureidopropyltrimethoxysilane, ureidopropyltriethoxysilane, ureidopropylmethyldimethoxysilane, ureidopropylmethyldiethoxysilane and the like.

Examples of the dicarboxylic anhydride include maleic anhydride, phthalic anhydride, tetrahydrophthalic anhydride, hexahydrophthalic anhydride, methyl-substituted tetrahydrophthalic anhydride, methyl-substituted hexahydrophthalic anhydride, 3,6-endomethylenetetrahydrophthalic anhydride, methyl-substituted-3,6-endomethylenetetrahydrophthalic anhydride and the like.

Examples of the (poly)(meth)acrylic compound include alkyl methacrylates such as methyl methacrylate, butyl methacrylate, 2-ethylhexyl methacrylate and the like, alkyl acrylates such as methyl acrylate, ethyl acrylate, butyl acrylate and the like, and acrylamide, acrylnitrile, ethylene glycol dimethacrylate and the like.

Examples of the polyamine compound include ethylenediamine, diethylenetriamine, trimethylenetriamine, tetraethylenepentamine, piperadine and the like.

Examples of the polyisocyanate compound include toluene diisocyanate, diphenylmethane diisocyanate, hexamethylene diisocyanate, 2,2,4-trimethylhexamethylene diisocyanate, 2,4,4-trimethylhexamethylene diisocyanate, p-phenylene diisocyanate-4,41-dicyclohexylmethane diisocyanate, 3,3'-dimethyldiphenyl-4,4'-diisocyanate, dianisidine diisocyanate, m-xylene diisocyanate, isophorone diisocyanate, 1,5-naphthalene diisocyanate, trans-1,4-cyclohexyl diisocyanate, lysine diisocyanate, dimethyltriphenylmethane tetraisocyanate, triphenylmethane triisocyanate, tris(isocyanatephenyl) thiophosphate and the like.

Examples of the (meth)acryl group-containing alkoxysilane include acrylic monomers having such alkoxysilyl groups as mentioned above.

Examples of the isocyanurate ring-containing silane include tris(trimethoxysilylpropyl)isocyanurate, bis(trimethoxysilylpropyl)allyl isocyanurate, and tris(triethoxysilylpropyl)isocyanurate.

Examples of the amidized ones of the reaction products of amino group-containing alkoxysilanes, epoxy group-containing alkoxysilanes and silylizing agents can be prepared according to the following process. In this case, the amino group-containing alkoxysilanes may be those mentioned above, of which N-(2-aminoethyl)-3-aminopropyltrimethoxysilane and N-(2-aminoethyl)-3-aminopropylmethyldimethoxysilane are preferred from the standpoints of adhesion and operability. Although the epoxy group-containing alkoxysilanes are not critical in nature, γ-glycidoxypropyltrimethoxysilane, γ-glycidoxypropylmethyldimethoxysilane, and β-(3,4-epoxycyclohexyl)ethylmethyldimethoxysilane are preferred from the standpoints of reactivity and operability. It will be noted that the silylizing agent used herein includes, for example, hexamethyldisilazane, N,N'-bis(trimethylsilyl)formamide, N,N'-bis(trimethylsilyl)urea or the like. This agent is used to protect the OH group formed through the reaction between the amino group-containing alkoxysilane and the epoxy group-containing alkoxysilane so that the reaction between the OH group and the alkoxysilyl group is prevented, thereby preventing the reaction product from changing with time.

The reaction of the amino group-containing alkoxysilane, epoxy group-containing alkoxysilane and silylizing agent may be carried out by dropping the epoxy group-containing alkoxysilane in a mixture of the amino group-containing alkoxysilane and the silylizing agent, followed by thermal reaction. Alternatively, the reaction may be performed by subjecting the amino group-containing alkoxysilane and the epoxy group-containing alkoxysilane to reaction and adding the silylizing agent to the resulting reaction product for further reaction. The reaction conditions may be appropriately chosen and preferably include a temperature of 50 to 150° C., more preferably 80 to 140° C. and a time of 1 to 12 hours, more preferably 3 to 8 hours.

With respect to the formulation ratio between the amino group-containing alkoxysilane and the epoxy group-containing alkoxysilane, if the molar ratio between the epoxy group and the amino group (═N—H) is less than 0.3, the alkoxy groups taking part in the crosslinkage in 1 molecule become too small in number to ensure good curability and the spread of the molecules in their entirety is not allowed, resulting in weak plane adhesion and thus poor adhesion. If, however, the molar ratio exceeds 1.2, there remain few ═N—H groups capable of amidization in an amidization step described hereinafter, with concern that waterproofing adhesion becomes poor. Accordingly, the molar ratio is preferably within a range of 0.3 to 1.2.

Further, this ingredient is one obtained by amidizing the reaction product. The amidization can be carried out by subjecting the reaction product to reaction with an acid halide, an acid anhydride or an acid isopropenyl ester such as acetic acid chloride, acetic acid bromide, propionic acid chloride, acetic anhydride, isopropenyl acetate, benzoyl chloride and the like.

The reaction product of an amino group-containing alkoxysilane and a dicarboxylic anhydride can be prepared according to the following method. In this case, the amino group-containing alkoxysilanes are ones mentioned above. From the standpoints of adhesion and stability, there are preferably used 3-aminopropyltrimethoxysilane, 3-aminopropyltriethoxysilane, 3-aminopropylmethyldiethoxysilane and the like.

The dicarboxylic anhydrides are those mentioned above. In view of adhesion and stability, there are preferably used tetrahydrophthalic anhydride, hexahydrophthalic anhydride, methyl-substituted tetrahydrophthalic anhydride, methyl-substituted hexahydrophthalic anhydride, 3,6-endomethylenetetrahydrophthalic anhydride, methyl-substituted-3,6-endomethylenetetrahydrophthalic anhydride and the like.

The reaction between this amino group-containing alkoxysilane and the dicarboxylic anhydride is carried by dropping the amino group-containing alkoxysilane in the dicarboxylic anhydride. On the other hand, the dicarboxylic anhydride may be dropped in the amino group-containing alkoxysilane for reaction. In this case, the reaction conditions are appropriately chosen and include those of 0 to 150° C., preferably 20 to 120° C. and 1 to 12 hours, preferably 2 to 8 hours.

It will be noted that the formulation ratio between the amino group-containing alkoxysilane and the dicarboxylic anhydride is such that if a molar ratio between the amino group ($-NH_2$) and the dicarboxylic anhydride is less than 0.3, there is concern that the number of the alkoxy group taking part in the crosslinking reaction in the reaction product becomes so small that satisfactory curability is not attained and adhesion lowers. If the molar ratio exceeds 1.8, there is also concern that the storage stability of the primer composition lowers owing to the amino group of an unreacted amino group-containing alkoxysilane. This, the molar ratio preferably ranged from 0.3 to 1.8.

Where the hydrolyzable silicon compound and/or its (partial) hydrolysis condensate (D) is formulated, the ingredient (D) is formulated in the vinyl polymer (A) to allow co-hydrolysis. The amount is preferably from zero to 50 parts by weight, more preferably from 0.5 to 30 parts by weight, per 100 parts by weight of the total solid content of the ingredients (A) and (B). If the amount of the ingredient (D) is too large, the resulting primer film becomes too hard, with concern that adhesion to an upper polysiloxane hard film lowers.

Next, constituent ingredients which may be optionally added to the primer composition of the invention are illustrated.

The primer composition of the invention may be further formulated with a thermoplastic vinyl resin. Such a resin is able to impart flexibility to the cured film of the primer composition and is also able to suppress an environmental temperature change undergoing the primer film, particularly, a phase change and softening phenomenon especially in a relatively high temperature range. This is, in turn, able to suppress the strain inside the primer film and at the interface with an upper film if formed upon lamination. Eventually, an upper layer, e.g. an organopolysiloxane-based protective film, is prevented from cracking and the primer film per se can be imparted with heat and water resistances.

The amount of the thermoplastic resin is in the range of zero to 50 parts by weight per 100 parts by weight of the effective ingredients (i.e. the total amount of the ingredients (A) and (B) in solid conversion herein and whenever it appears hereinafter) in the primer composition. If formulated, the amount ranges from 1 to 50 parts by weight, preferably from 3 to 45 parts by weight. If the amount exceeds 50 parts by weight, the resulting film lowers in crosslinking density, with concern that a crack resistance and hardness may lower.

The primer composition of the invention may be further formulated with a photostabilizer having at least one cyclic hindered amine structure or hindered phenol structure in the molecule. The formulation leads to improved weatherability. The photostabilizer used is preferably one which is well dissolved in a solvent employed for the primer composition, is miscible with the primer composition and is low in volatility.

Specific examples of a photostabilizer include
3-dodecyl-1-(2,2,6,6-tetramethyl-4-piperidinyl)pyrroridin-2,5-dione,
N-methyl-3-dodecyl-1-(2,2,6,6-tetramethyl-4-piperidinyl)-pyrrolidin-2,5-dione,
N-acetyl-3-dodecyl-1-(2,2,6,6-tetramethyl-4-piperidinyl)-pyrrolidin-2,5-dione,
bis(2,2,6,6-tetramethyl-4-piperidyl) sebacate,
bis(1,2,2,6,6-pentamethyl-4-piperidyl) sebacate,
tetrakis(2,2,6,6-tetramethyl-4-piperidyl)-1,2,3,4-butane tetracarboxylate,
tetrakis(1,2,2,6,6-pentamethyl-4-piperidyl)-1,2,3,4-butane tetracarboxylate,
a condensate of 1,2,3,4-butane tetracarboxylate, 2,2,6,6-tetramethyl-piperidinol and tridecanol,
8-acetyl-3-dodecyl-7,7,9,9-tetramethyl-1,3,8-triazaspiro[4,5]-decan-2,4-dione,
a condensate of 1,2,3,4-butane tetracarboxylate, 1,2,2,6,6-pentamethyl-4-piperidinol and β,β,β',β'-tetramethyl-3,9-(2,4,8,10-tetraoxaspiro[5,5]-undecane)diethanol, and
a condensate of 1,2,3,4-butane tetracarboxylate, 2,2,6,6-pentamethyl-4-piperidinol and β,β,β',β'-tetramethyl-3,9-(2,4,8,10-tetraoxaspiro[5,5]-undecane)diethanol.

For the purpose of fixing the photostabilizer, silyl-modified photostabilizers as set out in JP-B 61-56187 may be used including, for example,
2,2,6,6-tetramethylpiperidino-4-propyltrimethoxysilane,
2,2,6,6-tetramethylpiperidino-4-propylmethyldimethoxysilane,
2,2,6,6-tetramethylpiperidino-4-propyltriethoxysilane,
2,2,6,6-tetramethylpiperidino-4-propylmethyldiethoxysilane, and hydrolyzates thereof. These photostabilizers may be used singly or in combination of two or more.

The amount of the photostabilizer may range from 0 to 10 parts by weight per 100 parts by weight of the effective ingredients in the primer composition. Where the photostabilizer is formulated, the amount preferably ranges from 1 to 10 parts by weight. When the amount exceeds 10 parts by weight, there may be some case where adhesion of the resulting film lowers.

Organic UV absorbing agents may be added to the primer composition within a range not giving an adverse effect on the composition. In this connection, organic UV absorbing agents in good miscibility with the primer composition are preferred. Especially, compound derivatives whose main skeleton is based on a hydroxybenzophenone, a benzotriazole, a cyanoacrylate or a triazine are preferred. In addition, polymers such as vinyl polymers having a UV absorbing group at side chains may also be used. Specific examples include 2,4-dihydroxybenzophenone, 2,2',4,4'-tetrahydroxybenzophenone,
2-hydroxy-4-methoxybenzophenone,
2-hydroxy-4-methoxybenzophenone-5-sulfonic acid,
2-hydroxy-4-n-octoxybenzophenone,
2-hydroxy-4-n-dodecylxybenzophenone,
2-hydroxy-4-n-benzyloxybenzophenone,
2,2'-dihydroxy-4,4'-dimethoxybezophenone,
2,2'-dihydroxy-4,4'-diethoxybenzophenone,
2,2'-dihydroxy-4,4'-dipropoxybenzophenone,
2,2'-dihydroxy-4,4'-dibutoxybenzopheneone,
2,2'-dihydroxy-4-methoxy-4'-propoxybenzophenone,
2,2'-dihydroxy-4-methoxy-4'-butoxybenzophenone,
2,3,4-trihydroxybenzophenone,
2-(2-hydroxy-5-t-methylphenyl)benzotriazole,
2-(2-hydroxy-5-t-octylphenyl)benzotriazole,
2-(2-hydroxy-3,5-di-t-butylphenyl)benzotriazole,
ethyl-2-cyano-3,3-diphenylacrylate,
2-ethylhexyl-2-cyano-3,3-diphenylacrylate,
2-(2-hydroxy-4-hexyloxyphenyl)-4,6-diphenyltriazine and the like. These UV absorbing agents may be used singly or in combination of two or more.

The amount of the organic UV absorbing agent may range from 0 to 30 parts by weight per 100 parts by weight of the effective ingredients of the primer composition. If the agent is formulated, the amount preferably ranges from 0.5 to 30 parts by weight. If the amount is too large, the resulting film may suffer whitening in appearance and may lower in adhesion with a polysiloxane cured film.

Functional metal oxide fine particles may be added as an inorganic UV absorbing agent within a range of amount that does not adversely influences the primer composition. In this connection, such fine particles may be any ones, which ensure good miscibility with or dispersability in the primer composition and keeps a given level of transparency without whitening upon formation as a film. More particularly, the fine particles are those of simple metal oxides such as titanium oxide, cerium oxide, zinc oxide, tin oxide, zirconium oxide, antimony oxide, tungsten oxide, antimony-containing tin oxide, tin-containing indium oxide, iron oxide, alumina and the like, and composite metal oxides and mixtures thereof.

The amount of the fine particles of the metal oxides may range from 0 to 30 parts by weight per 100 parts by weight in total of the effective ingredients in the primer composition. If the fine particles are formulated, the amount is preferably in the range of 1 to 30 parts by weight. If the amount exceeds 30 parts by weight, the transparency of the resulting film may lower.

The primer composition is employed after arbitrary dilution with solvents. Such solvents include diacetone alcohol, propylene glycol monomethyl ether, ethylene glycol monomethyl ether, propylene glycol monoethyl ether, ethylene glycol monoethyl ether, isobutyl alcohol, isopropyl alcohol, n-butyl alcohol, n-propyl alcohol, acetone, methyl ethyl ketone, methyl isobutyl ketone, acetylacetone, ethyl acetate, butyl acetate, xylene, toluene and the like. The primer composition is generally diluted with such a solvent as mentioned above and it is preferred that the primer composition is used in the form of a solution having a concentration of the effective ingredients of the primer composition at 5 to 20% by weight.

In order to smoothen the film, an effective amount of a fluorine or silicone-based surfactant such as Frorad FC-4430 (made by Sumitomo 3M Limited) and KP-341 (made by Shin-Etsu Chemical Co., Ltd.). Moreover, for facilitating film curing, there may be added a catalytic amount of a crosslinking/curing catalyst such as Neostan U-810 (made by Nitto Kasei Co., Ltd.), B-7 (made by Nippon Soda Co., Ltd.), Organaticks ZA-60 and TC-200 (both, made by Matsumoto Pharmaceutical Manufacture Co., Ltd.).

The solution of the primer composition is coated onto a surface of a substrate, such as a plastic film or the like, which has been cleaned beforehand, followed by evaporating the diluent solvent at room temperature or under heating to form a film having a thickness of 0.5 to 20 μm, preferably 1 to 15 μm. If the thickness is less than 0.5 μm, desired weatherability cannot be obtained. Over 20 μm, not only coating properties lower, but also mechanical and optical characteristics that a resin substrate inherently has may lower.

Where the solvent is evaporated by heating, conditions preferably include a temperature within a range of normal temperatures to a heat-resistant temperature of the substrate and are more preferably those conditions including a temperature of 50° C. to 140° C. and a time of 1 minute to 2 hours, especially 5 minutes to 2 hours.

The coating method is not critical and can be carried out by roll coating, dip coating, flow coating, bar coating, spray coating, spin coating or the like.

When the primer composition of the invention is cured as set forth above, there can be formed a primer layer whose linear expansion coefficient is in the range of not greater than $150 \times 10^{-6}/°$ C., preferably not greater than $125 \times 10^{-6}/°$ C. If the linear expansion coefficient is too great, the tendency toward swelling or shrinkage of the film relative to a temperature change becomes great, with possible concern that a polysiloxane hard film laminated on the primer layer is liable to crack or adhesion at the interface lowers. Although the lower limit of the linear expansion coefficient is not critically limited, it is preferred that the coefficient is not smaller than $0/°$ C., more preferably not smaller than $1 \times 10^{-6}/°$ C. It will be noted that the linear expansion coefficient is measured in a manner as described hereinlater.

The plastic films and plastic moldings, such as a substrate, wherein a cured film is formed of the primer composition of the invention obtained as set out before, are excellent in initial adhesion, heat resistance, hot water resistance and weatherability. Moreover, when there is formed, on the primer film, a known organopolysiloxane composition, e.g. a hydrolyzate or co-hydrolyzate of at least one organopolysiloxane represented by the following general formula (1)

$$(R^7)_m Si(OR^8)_{4-m} \qquad (1)$$

wherein $R^7$ represent an organic group having 1 to 10 carbon atoms, $R^8$ represents a hydrogen atom or a monovalent organic group, and m is 0, 1 or 2, followed by heat curing, preferably, at 50 to 140° C. for 5 minutes to 3 hours, the resulting plastic molding conveniently exhibits good adhesion and abrasion resistance and excellent weatherability because the molding is formed thereon with the primer composition of the invention and the synergistic effect between the primer film and the organopolysiloxane film develops.

The organopolysiloxane is preferably so coated that a dry thickness after heat curing ranges from 0.2 to 20 μm, more preferably from 0.5 to 1.5 μm. If the thickness is too small, a desired hardness and abrasion resistance may not be obtained. Too large a thickness may lead to cracking in some case.

It will be noted that the coating method is not critical and can be carried out by roll coating, dip coating, flow coating, bar coating, spray coating, spin coating or the like.

In the above formula (1), the organic group represented by $R^7$ is an unsubstituted or substituted monovalent hydrocarbon group such as, for example, an alkyl group, an aryl group, a halogenated alkyl group, a halogenated aryl group, an alkenyl group or those hydrocarbon groups mentioned above wherein part of the hydrogen atoms thereof is substituted with an epoxy group, a (meth)acryloxy group, a mercapto group, an amino group, a cyano group or the like, or a heteroatom mediated organic group such as O, NH, $NCH_3$ or the like. Specific examples include an alkyl group such as methyl group, ethyl group, propyl group, isopropyl group, butyl group, hexyl group, decyl group, cyclohexyl group or the like, an aryl group such as phenyl group, phenetyl group or the like, a halogenated alkyl group such as 3-chloropropyl group, 3,3,3-trifluoropropyl group, 3,3,4,4,5,5,6,6,6-nonafluorohexyl group or the like, a halogenated aryl group such as p-chlorophenyl group or the like, an alkenyl group such as vinyl group, allyl group, 9-decenyl group, p-vinylbenzyl group or the like, an epoxy group-containing organic group such as 3-glycidoxypropyl group, β-(3,4-epoxycyclohexyl) ethyl group, 9,10-epoxydecyl group or the like, a (meth)acryloxy group-containing organic group such as γ-methacryloxypropyl group, γ-acryloxypropyl group or the like, a mercapto group-containing organic group such as γ-mercaptopropyl group, p-mercaptomethylphenylethyl group or the like, an amino group-containing organic group such as γ-aminopropyl group, (β-aminoethyl)-γ-aminopropyl group or the like, a cyano group-containing organic group such as β-cyanoethyl group or the like.

$R^8$ is a hydrogen atom or a monovalent organic group having 1 to 10 carbon atoms. Examples of the organic group include an alkyl group, an alkenyl group, an alkoxyalkyl group or an acyl group, of which an alkyl group and an acyl group are preferred. Specific examples include methyl group, ethyl group, propyl group, isopropyl group, butyl group, hexyl group, phenyl group, isopropenyl group, methoxyethyl group, acetyl group or the like.

Specific examples of the silane compound satisfying the above requirements include: trialkoxysilanes and triacyloxysilanes such as methyltrimethoxysilane, methyltriethoxysilane, methyltris(2-methoxyethoxy)silane, methyltriacetoxysilane, methyltripropoxysilane, methyltriisopropenoxysilane, methylbutoxysilane, ethyltrimethoxysilane, ethyltriethoxysilane, vinyltrimethoxysilane, vinyltriethoxysilane, vinyltriacetoxysilane, vinyltris(2-methoxyethoxy)silane, vinyltriisopropenoxysilane, phenyltrimethoxysilane, phenyltriethoxysilane, phenyltriacetoxysilane, γ-chloropropyltrimethoxysilane, γ-chloropropyltriethoxysilane, γ-chloropropyltripropoxysilane, 3,3,3-trifluoropropyltrimethoxysilane, γ-glycidoxypropyltrimethoxysilane, γ-glycidoxypropylmethyldimethoxysilane, γ-glycidoxypropyltriethoxysilane, γ-glycidoxypropylmethyldiethoxysilane, β-(3,4-epoxycyclohexyl)ethyltrimethoxysilane, β-(3,4-epoxycyclohexyl)ethylmethyldimethoxysilane, β-(3,4-epoxycyclohexyl)ethyltriethoxysilane, β-(3,4-epoxycyclohexyl)ethylmethyldiethoxysilane, γ-methacryloxypropyltrimethoxysilane, γ-acryloxypropyltrimethoxysilane, γ-aminopropyltrimethoxysilane, γ-aminopropyltriethoxysilane, γ-mercaptopropyltrimethoxysilane, γ-mercaptopropyltriethoxysilane, N-(β-aminoethyl)-γ-aminopropyltrimethoxysilane, β-cyanoethyltrimethoxysilane and the like; dialkoxysilanes and diacyloxysilanes such as dimethyldimethoxysilane, dimethyldiethoxysilane, dimethyldi(2-methoxyethoxy)silane, dimethyldiacetoxysilane, dimethyldipropoxysilane, dimethyldiisopropenoxysilane, dimethyldibutoxysilane, vinylmethyldimethoxysilane, vinylmethyldiethoxysilane, vinylmethyldiacetoxysilane, vinylmethyldi(2-methoxyethoxy)silane, vinylmethyldiisopropenoxysilane, phenylmethyldimethoxysilane, phenylmethyldiethoxysilane, phenylmethyldiacetoxysilane, γ-propylmethyldimethoxysilane, γ-propylmethyldiethoxysilane, γ-propylmethyldipropoxysilane, 3,3,3-trifluoropropylmethyldimethoxysilane, γ-methacryloxypropylmethyldimethoxysilane, γ-acryloxypropylmethyldimethoxysilane, γ-aminopropylmethyldimethoxysilane, γ-aminopropylmethyldiethoxysilane, γ-mercaptopropylmethyldimethoxysilane, γ-mercaptopropylmethyldiethoxysilane, N-(β-aminoethyl)-γ-aminopropylmethyldimethoxysilane, β-cyanoethylmethyldimethoxysilane and the like; tetraalkoxysilanes such as methyl silicate, ethyl silicate, n-propyl silicate, n-butyl silicate, sec-butyl silicate, t-butyl silicate and the like; and bissilane compounds such as bis(trimethoxysilyl)ethane, bis(trimethoxysilyl)hexane, bis(trimethoxysilyl)decane, bis(triethoxysilyl)hexane, bis(trimethoxysilyl)benzene, bis(trimethoxysilyloxydimethylsilyl)benzene, 1,8-bis(trimethoxysilyl)-3,3,4,4,5,5,6,6-octafluorooctane and the like.

These silane compounds may be (co)hydrolyzed by using at least one thereof. The hydrolyzates or (co)hydrolyzates of these silane compounds may be used singly in admixture of two or more.

The (co)hydrolyzate of a silane compound can be obtained, for example, by adding water to a lower alcohol solution of a silane compound and hydrolyzing in the presence of an acid catalyst. Examples of the lower alcohol include methanol, ethanol, isopropanol, butanol and the like. Solvents usable in combination with the alcohol include, for example, ketones such as acetone, acetylacetone and the like, esters such as ethyl acetate, isobutyl acetate and the like, and ethers such as propylene glycol monomethyl ether, dipropylene glycol monomethyl ether, diisopropyl ether and the like.

In order to improve a scratch resistance, it is preferred to use a colloidal silica-containing organpolysiloxane composition (hard coating composition) wherein there are added, to the organopolysiloxane composition, colloidal silica obtained by dispersing silica fine particles having a size of 1 to 100 nm in water or a solvent such as methanol, ethanol, isobutanol, propylene glycol monomethyl ether or the like in an amount of 5 to 70% by weight as a solid content.

For the manner of addition of colloidal silica, the colloidal silica may be simply added to the organopolysiloxane composition. Alternatively, the colloidal silica may be mixed with such a silane compound as mentioned above beforehand, followed by hydrolysis. When using an aqueous colloidal silica dispersion, the water of the aqueous colloidal silica dispersion may be used for hydrolysis as part or all of water necessary for the hydrolysis.

UV absorbing agents, which can be added to the organopolysiloxane composition, include, for example, inorganic ones in the form of fine particles of simple metal oxides such as titanium oxide, cerium oxide, zinc oxide, tin oxide, zirconium oxide, antimony oxide, tungsten oxide, antimony-containing tin oxide, tin-containing indium oxide, iron oxide, silica, alumina and the like, and composite metal oxides thereof, and mixtures thereof; chelating compounds of metals such as titanium, zinc, zirconium and the like and partial or full hydrolyzates thereof; and organic ones such as compound derivatives whose main skeletons have hydroxybenzophenone, benzotriazole, cyanoacrylate, triazine and the like structures and (co)polymers, such as vinyl polymers, having such UV absorbing groups as mentioned above at side chains thereof.

Further, as a curing catalyst for the organopolysiloxane composition, there may be added a catalytic amount of quaternary ammonium salts, alkali metal salts of organic acids, alkoxides or chelates such as of aluminium, titanium, chromium, iron and the like, perchlorates, acid anhydrides, polyamines, Lewis acids and the like.

The primer composition of the invention is conveniently used for various types of plastic materials, particularly, for polycarbonate resins, polystyrene resins, (meth)acrylic resins, urethane resins, thiourethane resins, polycondensates of halogenated bisphenol A and ethylene glycol, acrylic urethane resins, halogenated aryl group-containing acrylic resins, sulfur-containing resins, and composite laminate materials wherein the above-mentioned resins are laminated in two or more.

Plastic materials coated with a polysiloxane hard film are excellent in optical characteristics and can be conveniently used as an optical material.

EXAMPLES

Synthetic Examples, Examples and Comparative Examples are described so as to more particularly illustrate the invention. The invention should not be construed as limited to the following examples. It will be noted that percent (%) is % by weight and part(s) is part(s) by weight. The viscosity is a value measured at 25° C. based on JIS Z 8803. The moisture content is a value determined according to the Karl-Fischer method. The weight average molecular weight was measured according to gel permeation chromatography (GPC) using standard polystyrene as a reference. The rate of hydrolysis was calculated from the following equation using integral values of a methoxysilyl group-derived peak observed at 50.0 to 50.5 ppm and a peak derived from methanol caused by hydrolysis and observed at 49.0 to 49.5 ppm, both in $^{13}$C-NMR analyses.

Rate of hydrolysis(%)=[integration value of methanol-derived peak/(integral value of methanol-derived peak+integral value of methoxysilyl group-derived peak)]×100

The occurrence of hydrolysis was confirmed through disappearance and appearance of the following peaks in $^{29}$Si-NMR analyses.

Peak observed at −43 to −42.5 ppm:
derived from trimethoxysilyl group
Peak observed at −42.5 to −42 ppm:
derived from dimethoxysilyl group
Peak observed at −42 to −41.5 ppm:
derived from methoxydihydroxysilyl group
Peak observed at −41.5 to −41 ppm:
derived from trihydroxysilyl group

[Synthesis of Vinyl Polymer (A) Having a Hydrolyzable Silyl Group and Organic UV Absorbing Group Bonded at Side Chains]

Synthetic Example 1

152 g of diacetone alcohol was charged, as a solvent, into a 2-litter flask equipped with an agitator, a condenser and a thermometer and heated in a stream of nitrogen at 80° C. A 240 g portion of a preliminarily prepared solution of a monomer mixture (81 g of 2-[2'-hydroxy-5'-(2-methacryloxyethyl)phenyl]-2H-benzotriazole (RUVA 93, made by Otsuka Chemical Co., Ltd.), 90 g of γ-methacryloxypropyltrimethoxy-silane, 256.5 g of methyl methacrylate, 22.5 g of glycidyl methacrylate and 350 g of diacetone alcohol) and a 54 g portion of a preliminarily prepared solution of 2.3 g of 2,2'-azobis(2-methylbutyronitrile) serving as a polymerization initiator dissolved in 177.7 g of diacetone alcohol were successively charged. After reaction at 80° C. for 30 minutes, the remaining portion of the monomer mixed solution and the remaining portion of the polymerization initiator solution were simultaneously dropped in the reaction system in 1.5 hours at 80 to 90° C., followed by agitation at 80 to 90° C. for further 5 hours.

The resulting vinyl polymer having the trimethoxysilyl group and the organic UV absorbing group bonded at side chains thereof had a viscosity of 6,120 mPa-second. The content of the UV absorbing monomer was 18% and the content of the vinyl monomer wherein the trimethoxysilyl group was bonded to the side chain through the C—Si bond was 20%. The weight average molecular weight determined by the GPC analyses using standard polystyrene as a reference was at 66,200. The vinyl polymer (solution) obtained in this way was referred to as A-1.

Synthetic Examples 2 and 3 and Comparative Synthetic Examples 1 and 2

In the same manner as in Synthetic Example 1 using the formulations indicated in Table 1, there were obtained vinyl polymers A-2, A-3 and comparative vinyl polymers RA-1, Ra-2, respectively.

[Synthesis of an Organosilicon Compound Containing a Nitrogen Atom and a Hydrolyzable Silyl Group in the Molecule]

Synthetic Example 4

222 g of N-2-(aminoethyl)-3-aminopropyltrimethoxysilane and 242 g of hexamethyldisilazane serving as a silylizing agent were charged into a 2-liter flask equipped with an agitator, a condenser and a thermometer and heated in a stream of nitrogen at 120° C., in which 496 g of γ-glycidoxypropylmethyldiethoxysilane was dropped for reaction. After agitation under heating at 120° C. for 5 hours, low boiling fractions were removed under a reduced pressure at 100° C., thereby obtaining 862 g of a viscous compound having a viscosity of 1,387 mPa-second.

Next, 862 g of this reaction product and 862 g of toluene were charged into a 2-liter flask equipped with an agitator, a condenser and a thermometer, in which 143 g of acetic anhydride was dropped for reaction in a stream of nitrogen at room temperature. After agitation under heating at 110° C. for 2 hours, 141 g of methanol was dropped at 50° C., followed by further thermal agitation at 50° C. for an hour and removal of low boiling fractions under a reduced pressure at 100° C. to obtain a reddish brown, transparent, highly viscous compound.

IR spectral measurement of this compound revealed that no absorption ascribed to the OH group or NH group in a region of not smaller than 3,000 cm$^{-1}$ was recognized but a strong absorption ascribed to the amide group was observed at 1,650 cm$^{-1}$.

The resulting compound, which was diluted with propylene glycol monomethyl ether (PGM) so that the nonvolatile content (JIS K 6833) was at 25%, was referred to as compound (solution) C-1 containing a nitrogen atom and an alkoxysilyl group in the molecule.

[Preparation of a Colloidal Silica-Containing Organopolysiloxane Composition]

Synthetic Example 5

336 g of methyltriethoxysilane and 94 g of isobutanol were charged into a 1-liter flask equipped with an agitator, a condenser and a thermometer and kept at 5° C. or below while agitating under ice cooling, to which 283 g of an aqueous colloidal silica dispersion (Snowtex O (with an average particle size of 15 to 20 nm), made by Nissan Chemical Industries, Ltd., a product containing 20% of $SiO_2$) kept at not higher than 5° C. was added, followed by agitation under ice cooling for 3 hours and further under conditions of 20 to 25° C. for 12 hours. Thereafter, 27 g of diacetone alcohol and 50 g of propylene glycol monomethyl ether were added to the reaction system. Next, 3 g of a 10% sodium propionate aqueous solution and 0.2 g of polyether-modified silicone KP-341 (made by Shin-Etsu Chemical Co., Ltd.) serving as a leveling agent were further added, followed by adjusting a pH to 6 to 7 by means of acetic acid. The reaction system was so controlled with isobutanol that the nonvolatile content (JIS K 6833) was at 20% and aged for 5 days at room temperature. The resulting colloidal silica-containing organopolysiloxane composition had a viscosity of 4.2 mm$^2$/second and a weight average molecular weight of 1,100 when determined by the GPC analyses. This is referred to as colloidal silica-containing organopolysiloxane HC-1.

Synthetic Example 6

328 g of methyltrimethoxysilane and 10 g of 3,3,3-trifluoropropyltrimethoxysilane were charged into a 2-liter flask equipped with an agitator, a condenser and a thermometer and kept at 20° C. while agitating, to which 98 g of an aqueous colloidal silica dispersion (Snowtex 0 (with an average particle size of 15 to 20 nm), made by Nissan Chemical Industries, Ltd., a product containing 20% of $SiO_2$) and 230 g of a 0.25N acetic acid aqueous solution were added and agitated for 3 hours. Moreover, after agitation at 60° C. for 3 hours, 300 g of cyclohexanone was added, followed by distilling off secondarily produced methanol at normal pressures. Next, 300 g of isopropanol, 134 g of an isopropanol solution of 0.25% tetrabutylammonium hydroxide and 0.5 g of polyether-modified silicone KP-341 (made by Shin-Etsu Chemical Co., Ltd.) serving as a leveling agent were added, followed by controlling a nonvolatile content at 20% by use of isopropanol. The resulting colloidal silica-containing organopolysiloxane composition had a viscosity of 4.3 $mm^2$/second and a weight average molecular weight of 2,300 when determined by the GPC analyses. This is hereinafter referred to as colloidal silica-containing organopolysiloxane composition HC-2.

TABLE 1

Compositions of vinyl polymers (A) having an alkoxysilyl group and an organic UV absorbing group bonded at side chains thereof (unit: parts)

| | Synthetic Example | | | Comparative Example | |
|---|---|---|---|---|---|
| | 1 | 2 | 3 | 1 | 2 |
| Vinyl polymer | A-1 | A-2 | A-3 | RA-1 | RA-2 |
| MPTMS | 90 | 45 | 135 | 90 | |
| RUVA-1 | 81 | 45 | | | 67.5 |
| RUVA-2 | | | 112 | | |
| MMA | 256.5 | 285 | 203 | 337.5 | 355 |
| GMA | 22.5 | 45 | | 22.5 | 22.5 |
| VIAc | | 25 | | | |
| MHALS | | 5 | | | 5 |
| Total charge | 450 | 450 | 450 | 450 | 450 |
| Physical properties of polymer | | | | | |
| Viscosity (mPa-second) | 6,120 | 5,780 | 4,330 | 6,810 | 5,990 |
| Weight average molecular weight (MW) | 66,200 | 60,100 | 62,700 | 64,300 | 61,800 |

(Note)
MPTMS: γ-methacryloxypropyltrimethoxysilane
RUVA-1: 2-[2'-hdyroxy-5'-(2-methacryloxyethyl)phenyl]-2H-benzotriazole (RUVA-93, made by Otsuka Chemical Co., Ltd.)
RUVA-2: 2-hydroxy-4-(2-acryloxyethyl)benzophenone (BP-1A, made by Osaka Organic Chemical Industry Ltd.)
MMA: methyl methacrylate
GMA: glycidyl methacrylate
VIAc: vinyl acetate
MHALS: 1,2,2,6,6-pentamethyl-4-piperidyl methacrylate Examples concerning primer compositions are illustrated below.

Example 1

477.7 g (100 parts by weight in solid conversion) of vinyl polymer A-1 having the hydrolyzable silyl group and the organic UV absorbing group bonded at side chains thereof, 112.4 g (17.6 parts by weight in solid conversion) of colloidal silica dispersed in propylene glycol monomethyl ether acetate (PMA-ST with a solid concentration of 30% and a primary particle size of 10 to 15 nm, made by Nissan Chemical Industries Ltd.), i.e. silica fine particles dispersed in an organic solvent, 827.3 g of diacetone alcohol and 187.4 g of propylene glycol monomethyl ether were charged into a 2-liter flask equipped with an agitator, a condenser and a thermometer and well agitated while keeping at 25° C. 5.6 g (corresponding to 0.7 mole per mole of the methoxysilyl group in A-1) of deionized water was added, followed by agitation for 3 hours while keeping at 25° C. Thereafter, 138.1 g (corresponding to 3 moles per mole of the deionized water) of ethyl orthoformate serving as a dehydrating agent was added and agitated for further 3 hours at 25° C., followed by controlling the solid content by means of diacetone alcohol so that an involatile content (JIS K 6833) was made at 12%. This is referred to hereinafter as primer composition P-1.

Figure 2:
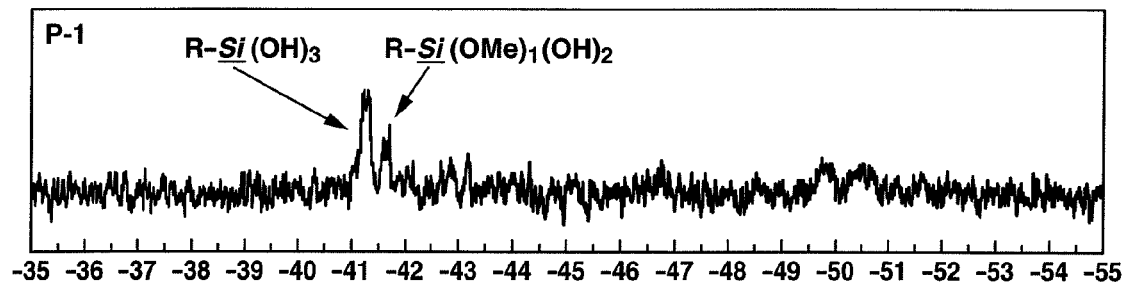
FIG. 2 is a $^{29}$Si-NMR spectral chart of primer composition P-1 in Example 1.

The thus obtained primer composition P-1 had a viscosity of 32.3 $mm^2$/second, a moisture content of 605 ppm, and a rate of hydrolysis of 58% when determined by $^{13}$C-NMR analyses (see P-1 in FIG. 1). According to $^{29}$Si-NMR analyses, it was revealed that the peak derived from the trimethoxysilyl group observed at −43 to −42.5 ppm almost disappeared and, instead, there were observed peaks at −42.5 to −42 ppm (derived from the dimethoxyhydroxysilyl group), at −42 to −41.5 ppm (derived from the methoxydihydroxysilyl group) and at −41.5 to −41 ppm (derived from the trihydroxysilyl group (see P-1 in FIG. 2).

Comparative Example 1

The general procedure of Example 1 was repeated except that the hydrolysis operation wherein deionized water was added and the dehydration operation wherein ethyl orthoformate was added were not carried out. The resulting composition is referred to hereinafter as primer composition PR-1.

Figure 3:
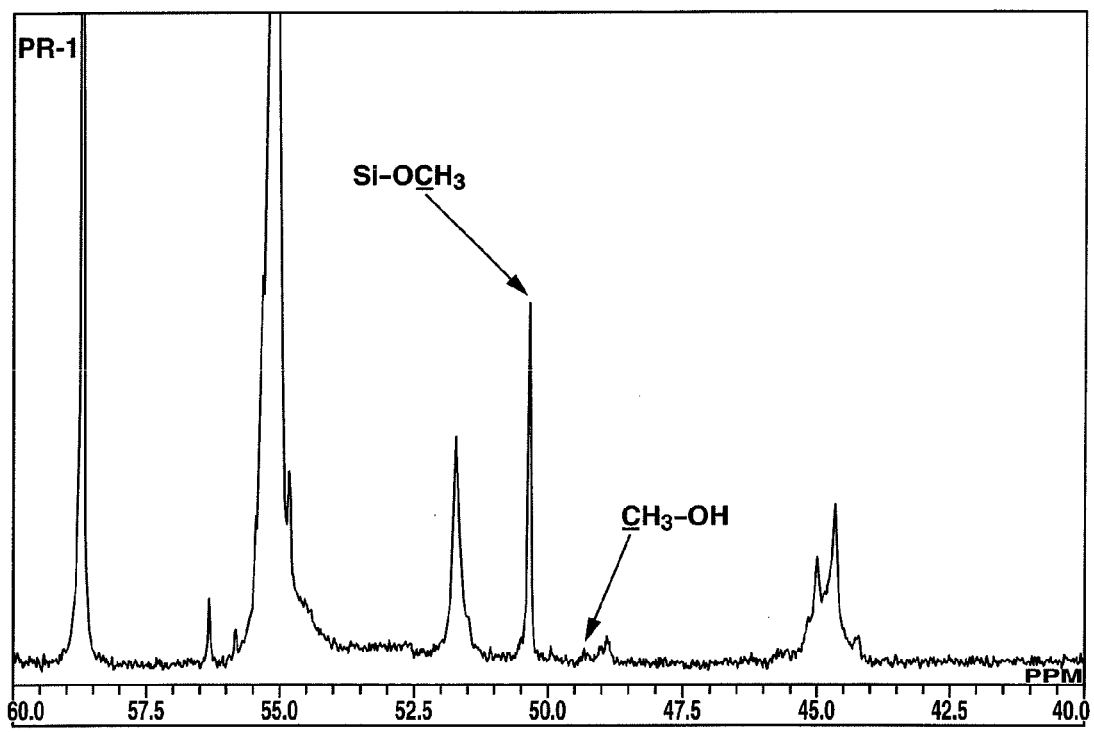
FIG. 3 is a $^{13}$C-NMR spectral chart of primer composition PR-1 in Comparative Example 1.
Figure 4:
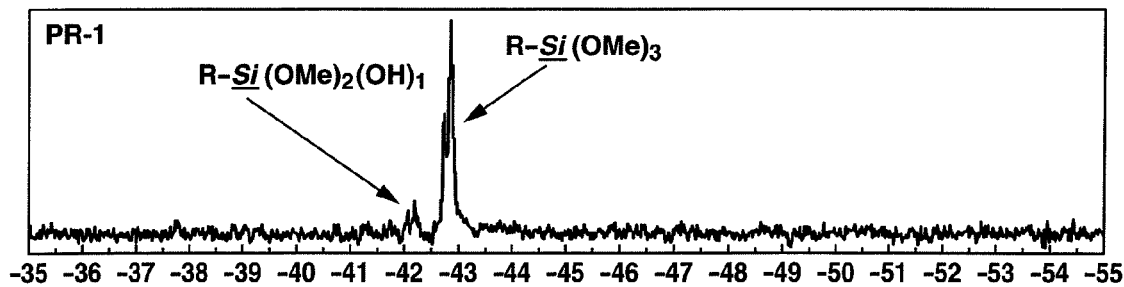
FIG. 4 is a $^{29}$Si-NMR spectral chart of primer composition PR-1 in Comparative Example 1.

The primer composition had a viscosity of 24.0 $mm^2$/second, a moisture content of 798 ppm and a rate of hydrolysis of 1% when determined by $^{13}$C-NMR analyses (see PR-1 in FIG. 3). According to $^{29}$Si-NMR analyses, it was revealed that the trimethoxysilyl group-derived peak observed at −43 to −42.5 ppm was substantially left and the dimethoxyhydroxysilyl group-derived peak observed at −42.5 to −42 ppm was only slight (see PR-! in FIG. 4).

Comparative Example 2

The general procedure of Examples 1 was repeated except that no dehydration operation of adding ethyl orthoformate was carried out. The resulting composition was referred to hereinafter as primer composition PR-2.

The thus obtained primer composition had a viscosity of 35.1 $mm^2$/second, a moisture content of 0.46%, and a rate of hydrolysis of 60% when determined by $^{13}$C-NMR analyses.

Example 2

477.7 g (100 parts by weight in solid conversion) of vinyl polymer A-1 having the hydrolyzable silyl group and the organic UV absorbing group bonded at side chains thereof, and 827.3 g of diacetone alcohol were charged into a 2-liter flask equipped with an agitator, a condenser and a thermometer and well agitated while keeping at 25° C. 5.6 g (corresponding to 0.7 mole per mole of the methoxysilyl group in A-1) of deionized water was added, followed by agitation for 5 hours while keeping at 80° C. After cooling down to room temperature, 112.4 g (17.6 parts by weight in solid conversion) of colloidal silica dispersed in propylene glycol monomethyl ether acetate (PMA-ST with a solid concentration of 30% and a primary particle size of 10 to 15 nm, made by Nissan Chemical Industries Ltd.), i.e. silica fine particles dispersed in an organic solvent, and 187.4 g of propylene glycol monomethyl ether were further charged and agitated for 10 hours while keeping at 25° C. Thereafter, 138.1 g (corresponding to 3 moles per mole of the deionized water) of ethyl orthoformate serving as a dehydrating agent was added and agitated for further 3 hours at 25° C., followed by controlling the solid content by means of diacetone alcohol so that an involatile content (JIS K 6833) was made at 12%. This composition is referred to hereinafter as primer composition P-2.

Figure 5:
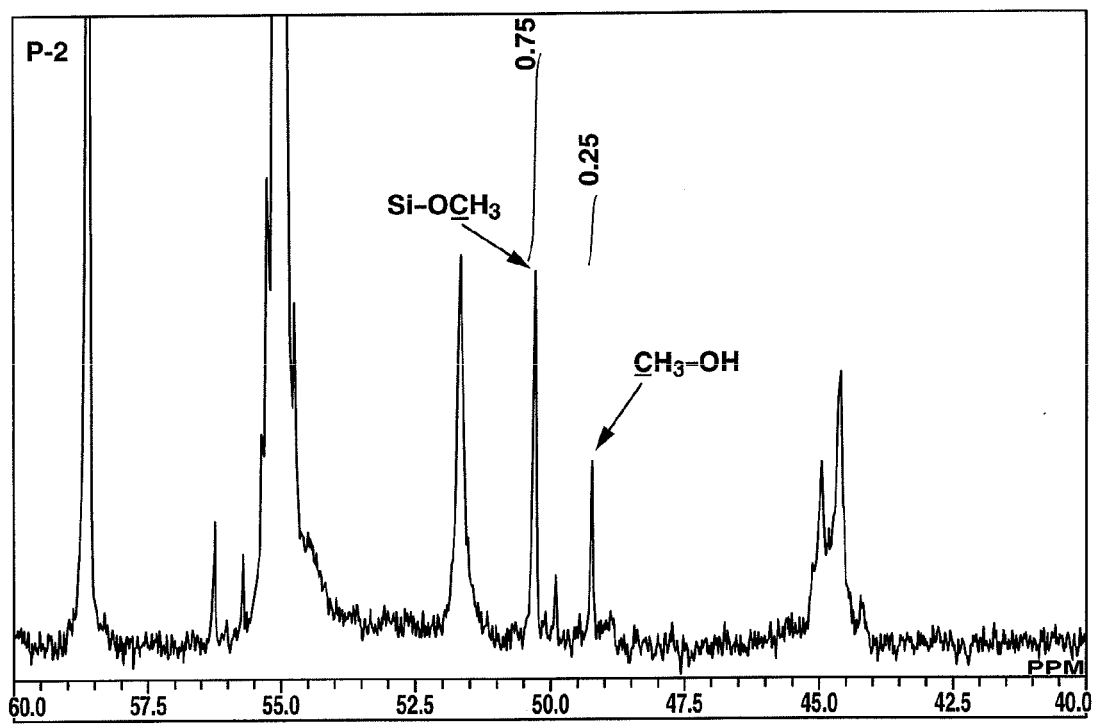
FIG. 5 is a $^{13}$C-NMR spectral chart of primer composition P-2 in Example 2.
Figure 6:
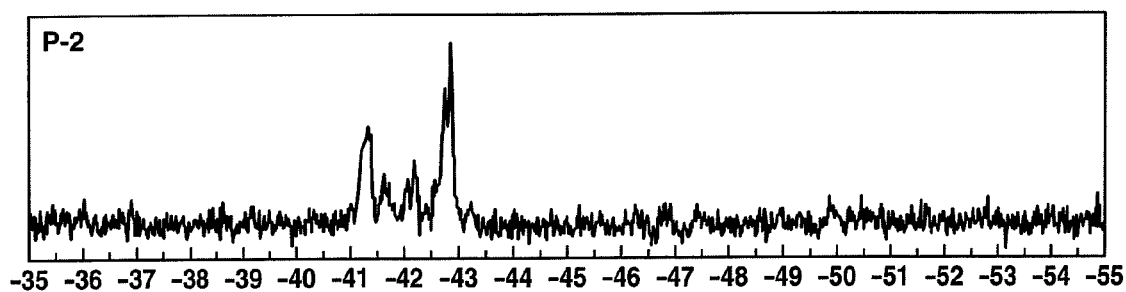
FIG. 6 is a $^{29}$Si-NMR spectral chart of primer composition P-2 in Example 2.

The thus obtained primer composition P-2 had a viscosity of 30.7 mm$^2$/second, a moisture content of 538 ppm, and a rate of hydrolysis of 25% when determined by $^{13}$C-NMR analyses (see P-2 in FIG. 5). According to $^{29}$Si-NMR analyses, it was revealed that peaks at −43 to −42.5 ppm (derived from the trimethoxysilyl group), at −42.5 to −42 ppm (derived from the dimethoxyhydroxysilyl group), at −42.0 to −41.5 ppm (derived from the methoxydihydroxysilyl group) and at −41.5 to −41 ppm (derived from the trihydroxysilyl group) were observed, respectively (see P-2 in FIG. 6).

Examples 3 and 4 and Comparative Examples 3 to 5

In the same manner as in Example 1, formulations (in solid conversion) indicated in Tables 2 and 3 were used to obtain primer compositions, followed by hydrolysis and dehydration operations. The resulting primer compositions were, respectively, referred to as P-3 (Example 3), P-4 (Example 4), PR-3 (Comparative Example 3), PR-4 (Comparative Example 4) and PR-5 (Comparative Example 5). The physical properties of the primer compositions are also shown in Tables 2 and 3.

It will be noted that among the abbreviations used in the examples and comparative examples, those not illustrated in the synthetic examples are as illustrated below.

Silica Fine Particles Dispersed in an Organic Solvent
 B-1: colloidal silica dispersed in propylene glycol monomethyl ether acetate (PMA-ST with a solid concentration of 30% and a primary particle size of 10 to 15 nm, made by Nissan Chemical Industries Ltd.)
 B-2: colloidal silica dispersed in methyl ethyl ketone (MEK-ST with a solid concentration of 30% and a primary particle size of 10 to 15 nm, made by Nissan Chemical Industries Ltd.)
 B-3: colloidal silica dispersed in methyl isobutyl ketone (MIBK-ST with a solid concentration of 30% and a primary particle size of 10 to 15 nm, made by Nissan Chemical Industries Ltd.)

Dehydrating Agent
 Zeolite solid adsorbent, Molecular Sieve 3A (made by Wako Pure Chemical Industries, Ltd.)

Thermoplastic Resin
 POL-1: 40% diacetone alcohol solution of polymethyl methacrylate resin (Dyanal BR-80, made by Mitsubishi Rayon Co., Ltd.)

Organic UV Absorbing Agent
 UVA-1: 2-[2-hydroxy-4-(1-octyloxycarbonylethoxy)phenyl]-4,6-bis(4-phenylphenyl)-1,3,5-triazine (Tinuvin 479, made by Ciba Japan K.K.)
 UVA-2: 2,2',4,4'-tetrahydroxybenzophenone (Seesorb 106, made by Shipro Kasei Kaisha, Ltd.)

Inorganic UV Absorbing Agent
 UVA-3: dispersion of 15% zinc oxide fine particles in an alcohol solvent (ZNAP 15% by weight, made by C.I. Kasei Co., Ltd.

Hindered Amine Photostabilizer
 HALS-1: N-acetyl-3-dodecyl-1-(2,2,6,6-tetramethyl-4-piperidinyl)pyrrolidin-2,5-dione (Sandbar 3058 Liq., made by Clariant (Japan) K.K.)

Various physical properties in the examples were measured according to the following methods and evaluated as follows.

Various evaluations were made on a primer composition of the invention, its cured film alone, and a laminate film wherein a colloidal silica-containing organopolysiloxane composition layer is laminated and cured on the first-mentioned cured film, all for each sample.

[Storage Stability]

A primer composition was stored at room temperature for 2 weeks in a 100-ml plastic bottle, and was subjected to measurement of a viscosity and evaluated according to the following standards.

(1) Storage Stability
 ◯: a difference between a viscosity after 2 weeks and an initial viscosity is less than 10 mm$^2$/second.
 Δ: a difference between a viscosity after 2 weeks and an initial viscosity is from 10 mm$^2$/second to less than 100 mm$^2$/second.
 X: a difference between a viscosity after 2 weeks and an initial viscosity is not less than 100 mm$^2$/second.

(2) Linear Expansion Coefficient 1.5 g of a primer composition was weighed in an aluminium cup and allowed to stand at room temperature for 8 hours, thereby removing a volatile matter. Next, curing was performed on a hot plate at 80° C. for an hour and at 130° C. for an hour. After allowing to cool down to room temperature, the primer cured film was peeled off from the aluminium cup, followed by cutting into a 15 mm×5 mm test piece (film thickness: about 150 μm).

Analytical instrument:
 TMA 7000 (thermomechanical analyzer, made by ULVAC, Inc.)
Temperature conditions:
 25 to 150° C., heating rate of 5° C./minute
Load: 5 g
Atmosphere: air
Measurement: three measurements wherein values within a temperature range of 35 to 45° C. were averaged.

(3) Appearance of Initial Coated Film

A film appearance was visually observed with respect to a test piece made of a laminate film obtained by successively curing and laminating a primer composition layer and a colloidal silica-containing organopolysiloxane composition layer.

(4) Primary Adhesion

In conformity with JIS K 5400, a test piece was cross cut, i.e. longitudinally and horizontally cut each in 6 cut lines at 2-mm intervals, with a razor blade to provide 25 cross hatch patterns. A commercially available cellophane self-adhesive tape was intimately contacted with the patterns. Thereafter, the tape was abruptly peeled off toward the near side at an angle of 90°, and the number (X) of the patterns left without peeling was indicated as X/25.

(5) Waterproofing and Waterproofing Adhesion

A test piece was immersed in boiling water for 2 hours, after which an appearance thereof was visually observed and the test piece was subjected to an adhesion test as in (2) above.

(6) Scratch Resistance Test

In conformity with ASTM 1044, an abrasion ring CS-10F was mounted in a Taber abrasion tester, followed by measurement of a haze after 500 revolutions under a load of 500 g. The scratch resistance (%) was expressed by (haze after the test)−(haze before the test).

(7) Weatherability Test

Using an Eye Super UV Tester, made by Iwasaki Electric Co., Ltd., a test was conducted in such a way that a cycle of [a black panel temperature of 63° C., a humidity of 50% RH, a luminance of 50 mW/cm² and a rainfall of 10 seconds/hour continued over 5 hours] and [a black panel temperature of 30° C. and a humidity of 95% RH continued over an hour] was repeated over 250 hours and 500 hours, respectively. The yellowness was determined in conformity with JIS K 7103, and weather-resistant film cracking and peeling off of the weather-resistant film were observed visually or through microscope (magnification factor of 250) prior to and after the weatherability test.

[Weather-Resistant Film Cracking]

A film appearance after the weatherability test was evaluated according to the following standards.
○: nothing abnormal detected
Δ: slightly cracked
X: cracked throughout film

[Peeling Off of Weather-Resistant Film]

The state of film after the weatherability test was evaluated according to the following standards.
○: nothing abnormal detected
Δ1: partial peeling off between a colloidal silica-containing organopolysiloxane composition layer and a primer composition layer
Δ2: partial peeling off between a primer composition layer and a substrate
X1: full peeling off between a colloidal silica-containing organopolysiloxane composition layer and a primer composition layer
X2: full peeling off between a primer composition layer and a substrate

TABLE 2

Composition (in solid conversion) and film characteristics

| | Example | | | |
|---|---|---|---|---|
| | 1 | 2 | 3 | 4 |
| Primer composition | P-1 | P-2 | P-3 | P-4 |
| (A) (alkoxysilyl group + UV absorbing group)-containing vinyl polymer | A-1 100 parts | A-1 100 parts | A-3 100 parts | A-2 100 parts |
| (B) Silica fine particles dispersed in an organic solvent | B-1 17.6 parts | B-1 17.6 parts | B-3 100 parts | B-2 30 parts |
| Amount of water for hydrolysis (relative to unit mole of an alkoxysilyl group) | 0.7 mole | 0.7 mole | 1.5 moles | 3 moles |
| (C) Dehydrating agent (relative to unit mole of hydrolysis water) | Ethyl orthoformate 3 moles | Ethyl orthoformate 3 moles | Ethyl orthoformate 5 moles | Molecular Sieve 3A 10 parts |
| (D) (N + alkoxysilyl group)-containing organosilicon compound | | | | C-1 5 parts |
| Thermoplastic resin | | | POL-1 40 parts | |
| Additives | | | | UAV-1 3 parts HALS-1 1 part |
| Results of evaluation | | | | |
| Rate of hydrolysis (%) | 58 | 25 | 93 | 75 |
| Moisture content (ppm) | 605 | 538 | 441 | 728 |
| Initial viscosity (mm²/s) | 32.3 | 30.7 | 51.2 | 38.4 |
| Viscosity after 2 weeks at room temperature (mm²/s) | 35.6 | 32.6 | 53.8 | 43.9 |
| Storage stability | ○ | ○ | ○ | ○ |
| Linear expansion coefficient (×10⁻⁶/° C.) | 40 | 43 | 25 | 110 |

TABLE 3

Composition (in solid conversion) and film characteristics

| | Comparative Example | | | | |
|---|---|---|---|---|---|
| | 1 | 2 | 3 | 4 | 5 |
| Primer composition | PR-1 | PR-2 | PR-3 | PR-4 | PR-5 |
| (A) (alkoxysilyl group + UV absorbing group)-containing vinyl polymer | A-1 100 parts | A-1 100 parts | RA-2 100 parts | RA-1 100 parts | A-1 100 parts |
| (B) Silica fine particles dispersed in an organic solvent | B-1 17.6 parts | B-1 17.6 parts | B-3 100 parts | B-2 33 parts | |

TABLE 3-continued

Composition (in solid conversion) and film characteristics

| | Comparative Example | | | | |
|---|---|---|---|---|---|
| | 1 | 2 | 3 | 4 | 5 |
| Amount of water for hydrolysis (relative to unit mole of an alkoxysilyl group) | | 0.7 mole | 0.7 mole | 0.5 mole | 3 moles |
| (C) Dehydrating agent (relative to unit mole of hydrolysis water) | | | Molecular Sieve 3A 10 parts | | Ethyl orthoformate 5 moles |
| (D) (N + alkoxysilyl group)-containing organosilicon compound | | | | C-1 5 parts | |
| Thermoplastic resin | | | POL-1 40 parts | | |
| Additives | | | | UVA-1 3 parts HALS-1 1 part | |
| Results of evaluation | | | | | |
| Rate of hydrolysis (%) | 1 | 60 | 0 | 38 | 5 |
| Moisture content (ppm) | 798 | 4,600 | 907 | 3,300 | 492 |
| Initial viscosity (mm²/s) | 24.0 | 35.1 | 61.2 | 41.3 | 25.7 |
| Viscosity after 2 weeks at room temperature (mm²/s) | 30 | gelled | 62.9 | 126 | 27.9 |
| Storage stability | ○ | X | ○ | Δ | ○ |
| Linear expansion coefficient (×10⁻⁶/° C.) | 51 | 130 | 242 | 127 | 302 |

Examples 5 to 8 and Comparative Examples 6 to 10

The primer compositions obtained in Examples 1 to 4 and Comparative Examples 1 to 5 were, respectively, stored at room temperature for a week and coated onto a 0.5-mm thick polycarbonate resin sheet (Iupilon Sheet, made by Mitsubishi Engineering-Plastics Corporation), the surface of which had been cleaned, according to a dip coating method in a cured film thickness of about 6 to 8 μm, followed by curing at 135° C. for 30 minutes. Moreover, mixtures of the colloidal silica-containing organopolysiloxane compositions (HC-1, 2) prepared in Synthetic Examples 5, 6 and UV absorbing agents (UVA-2, 3) as additives were, respectively, coated onto the cured films according to a dip coating technique in a cured film thickness of about 2 to 3 μm and cured at 135° C. for an hour. The resulting films were, respectively, provided as a test piece. The results of various physical properties are shown in Tables 4 and 5.

TABLE 4

Composition (in solid conversion) and film characteristics

| | Example | | | |
|---|---|---|---|---|
| | 5 | 6 | 7 | 8 |
| Primer composition | P-1 | P-2 | P-3 | P-4 |
| Colloidal silica-containing organopolysiloxane composition | HC-2 100 parts | HC-2 100 parts | HC-1 100 parts | HC-2 100 parts |
| Additives | | UVA-3 1 part | | UVA-2 2 parts |
| Results of evaluation | | | | |
| Initial film appearance | No abnormality detected | No abnormality detected | No abnormality detected | No abnormality detected |
| Primary adhesion | 25/25 | 25/25 | 25/25 | 25/25 |
| Waterproofing appearance | No abnormality detected | No abnormality detected | No abnormality detected | No abnormality detected |
| Waterproofing adhesion | 25/25 | 25/25 | 25/25 | 25/25 |
| Scratch resistance (%) | 4 | 6 | 2 | 7 |
| Weatherability after 250 hours — Yellowness | <1 | <1 | <1 | <1 |
| Weatherability after 250 hours — Film cracking | ○ | ○ | ○ | ○ |
| Weatherability after 250 hours — Peeling off of film | ○ | ○ | ○ | ○ |
| Weatherability after 500 hours — Yellowness | 7 | 3 | 4 | 4 |
| Weatherability after 500 hours — Film cracking | ○ | ○ | ○ | ○ |
| Weatherability after 500 hours — Peeling off of film | ○ | ○ | ○ | ○ |

TABLE 5

Composition (in solid conversion) and film characteristics

| | Comparative Example | | | | |
|---|---|---|---|---|---|
| | 6 | 7 | 8 | 9 | 10 |
| Primer composition | PR-1 | PR-2 | PR-3 | PR-4 | PR-5 |
| Colloidal silica-containing organopolysiloxane composition | HC-2 100 parts | HC-2 100 parts | HC-1 100 parts | HC-1 100 parts | HC-2 100 parts |
| Additives | | UVA-3 1 part | | | UVA-2 2 parts |
| Results of evaluation | | | | | |
| Initial film appearance | No abnormality detected | No abnormality detected | No abnormality detected | No abnormality detected | No abnormality detected |
| Primary adhesion | 25/25 | 25/25 | 25/25 | 25/25 | 25/25 |
| Waterproofing appearance | No abnormality detected | No abnormality detected | No abnormality detected | No abnormality detected | No abnormality detected |
| Waterproofing adhesion | 25/25 | 5/25 | 25/25 | 25/25 | 25/25 |
| Scratch resistance (%) | 5 | 8 | 3 | 4 | 8 |
| Weatherability after 250 hours — Yellowness | <1 | 5 | <1 | 17 | <1 |
| Weatherability after 250 hours — Film cracking | ○ | ○ | ○ | Δ | ○ |
| Weatherability after 250 hours — Peeling off of film | ○ | X1 | ○ | X1, X2 | ○ |
| Weatherability after 500 hours — Yellowness | 9 | | 21 | | 18 |
| Weatherability after 500 hours — Film cracking | Δ | | X | | Δ |
| Weatherability after 500 hours — Peeling off of film | Δ1 | | X1 | | X1 |

Japanese Patent Application No. 2008-229986 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for preparing a primer composition for forming a polysiloxane hard film, which method comprises the following steps (I) to (III):
   (I) preparing a primer precursor containing a vinyl polymer (A) having a hydrolysable silyl group and an organic UV absorbing group bonded at side chains thereof and silica fine particles (B) dispersed in an organic solvent;
   (II) adding water in an amount of from 0.1 to less than 5 moles per mole of the hydrolyzable silyl group in the vinyl polymer (A) to said primer precursor obtained in (I) for hydrolysis; and
   (III) adding a dehydrating agent (C) in an amount of 1 to 20 moles per mole of water to said composition containing the hydrolyzate obtained in (II) to remove moisture from said composition.

2. The method according to claim 1, wherein said dehydrating agent (C) is at least one member selected from an orthocarboxylic ester, a dialkylcarbodiimide and a solid adsorbent.

3. The method according to claim 2, wherein said dehydrating agent (C) is at least one member selected from a methyl orthoformate, an ethyl orthoformate, a methyl orthoacetate and an ethyl orthoacetate.

4. The method according to claim 1, wherein said vinyl polymer (A) is further formulated with at least one member (D) selected from a hydrolysable silicon compound and a partially or fully hydrolysed condensate thereof to co-hydrolyze.

5. The method according to claim 4, wherein said member (D) has a compound containing a nitrogen atom and an alkoxysilyl group in the molecule.

6. The method according to claim 1, wherein said vinyl polymer (A) has a vinyl polymer that is obtained by copolymerizing monomer ingredients comprising a vinyl monomer (a-1) having a hydrolysable silyl group bonded thereto through a C-Si bond, a vinyl monomer (a-2) having an organic UV absorbing group, and other copolymerizable monomer (a-3).

7. The method according to claim 1, wherein said silica fine particles (B) dispersed in an organic solvent have a primary particle size within a range of 0.5 to 100 nm.

* * * * *